(12) United States Patent
Gabara

(10) Patent No.: US 9,299,348 B2
(45) Date of Patent: Mar. 29, 2016

(54) METHOD AND APPARATUS FOR OBTAINING INFORMATION FROM THE WEB

(71) Applicant: TrackThings LLC, Murray Hill, NJ (US)

(72) Inventor: Thaddeus John Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 0 days.

(21) Appl. No.: 14/332,427

(22) Filed: Jul. 16, 2014

(65) Prior Publication Data

US 2014/0330562 A1 Nov. 6, 2014

Related U.S. Application Data

(63) Continuation of application No. 13/013,886, filed on Jan. 26, 2011.

(51) Int. Cl.

| *G10L 15/00* | (2013.01) |
| *G10L 15/04* | (2013.01) |
| *G10L 15/26* | (2006.01) |
| *G10L 17/00* | (2013.01) |
| *G10L 15/08* | (2006.01) |
| *G10L 25/87* | (2013.01) |
| *G10L 17/04* | (2013.01) |
| *G10L 21/0208* | (2013.01) |

(52) U.S. Cl.
CPC ............... *G10L 15/265* (2013.01); *G10L 15/08* (2013.01); *G10L 17/00* (2013.01); *G10L 15/00* (2013.01); *G10L 17/04* (2013.01); *G10L 21/0208* (2013.01); *G10L 25/87* (2013.01); *G10L 2015/088* (2013.01)

(58) Field of Classification Search
USPC .................................. 704/231–257, 270–275
See application file for complete search history.

(56) References Cited

U.S. PATENT DOCUMENTS

| 4,864,623 | A | * | 9/1989 | Van Nes et al. ............... 704/275 |
| 5,335,285 | A | | 8/1994 | Gluz |
| 5,737,436 | A | | 4/1998 | Boyden |
| 5,761,641 | A | * | 6/1998 | Rozak et al. .................. 704/275 |
| 6,757,361 | B2 | * | 6/2004 | Blair et al. .................... 379/67.1 |
| 7,133,828 | B2 | * | 11/2006 | Scarano et al. ............... 704/251 |

(Continued)

OTHER PUBLICATIONS

Smith-Lovin and Brody, Interruptions in Group Discussions: The Effects of Gender and Group Composition, American Sociological Review, 1989, vol. 54, pp. 424-435.

*Primary Examiner* — Jesse Pullias
(74) *Attorney, Agent, or Firm* — Thaddeus Gabara; Tyrean Patent Prosecution Law Firm

(57) ABSTRACT

An intelligent conversation system augmenting a conversation between two or more individuals uses a speech to text block configured to convert voices of the conversation into text, a determination circuit configured to determine topics from the text of the conversation, search parameters determined by the determination circuit from the topics are sent to an Internet, search results corresponding to the search parameters are received from the Internet; and a memory configured to store the search results received from the Internet. The speech to text block is configured to convert the search results to speech. An earphone is configured to transmit the speech to one of the two or more individuals. The speech is used by one of the individuals to augment the conversation.

19 Claims, 19 Drawing Sheets

(56) References Cited

U.S. PATENT DOCUMENTS

| | | |
|---|---|---|
| 7,702,122 B2 | 4/2010 | Crutcher |
| 7,751,597 B2 | 7/2010 | Gabara |
| 7,848,093 B2 | 12/2010 | Hardson et al. |
| 7,974,432 B1 | 7/2011 | Ryan |
| 8,107,653 B2 | 1/2012 | Wolfe |
| 8,107,664 B2 | 1/2012 | Mao |
| 8,189,844 B2 | 5/2012 | Dolberg |
| 8,316,467 B2 | 11/2012 | Foust et al. |
| 8,410,927 B2 | 4/2013 | Gabara |
| 2004/0179694 A1 | 9/2004 | Alley |
| 2006/0251283 A1 | 11/2006 | Yeh |
| 2007/0047697 A1 | 3/2007 | Drewry |
| 2007/0092087 A1 | 4/2007 | Bothra et al. |
| 2007/0140644 A1 | 6/2007 | Gabara |
| 2007/0185601 A1 | 8/2007 | Lee et al. |
| 2008/0082334 A1 * | 4/2008 | Watson ............... 704/251 |
| 2008/0112591 A1 | 5/2008 | Gabara |
| 2008/0139254 A1 | 6/2008 | Levy |
| 2009/0028356 A1 | 1/2009 | Ambrose et al. |
| 2009/0055185 A1 * | 2/2009 | Nakade et al. ............ 704/257 |
| 2010/0219936 A1 | 9/2010 | Gabara |
| 2010/0290657 A1 | 11/2010 | Wiggins et al. |
| 2012/0105740 A1 | 5/2012 | Jannard et al. |
| 2012/0189129 A1 | 7/2012 | Gabara |
| 2012/0191454 A1 | 7/2012 | Gabara |
| 2012/0210489 A1 | 8/2012 | Abreu |
| 2012/0220234 A1 | 8/2012 | Abreu |

* cited by examiner

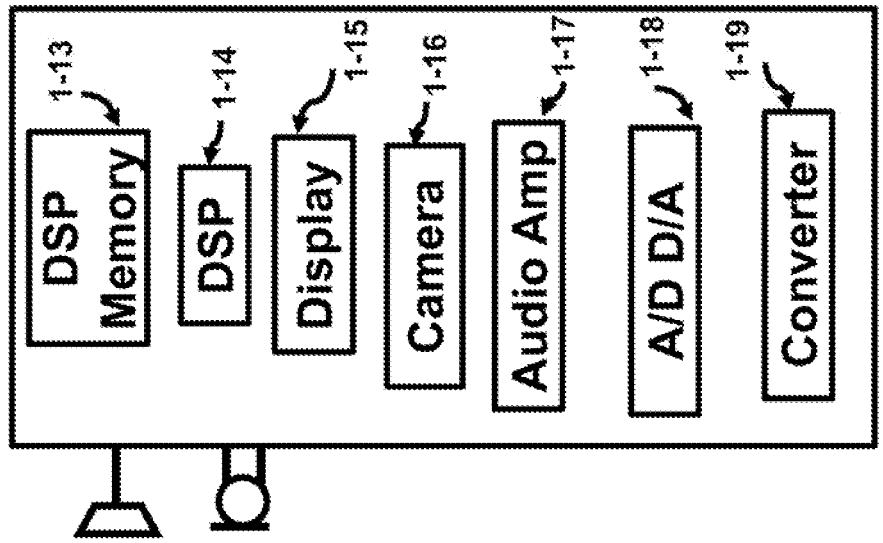
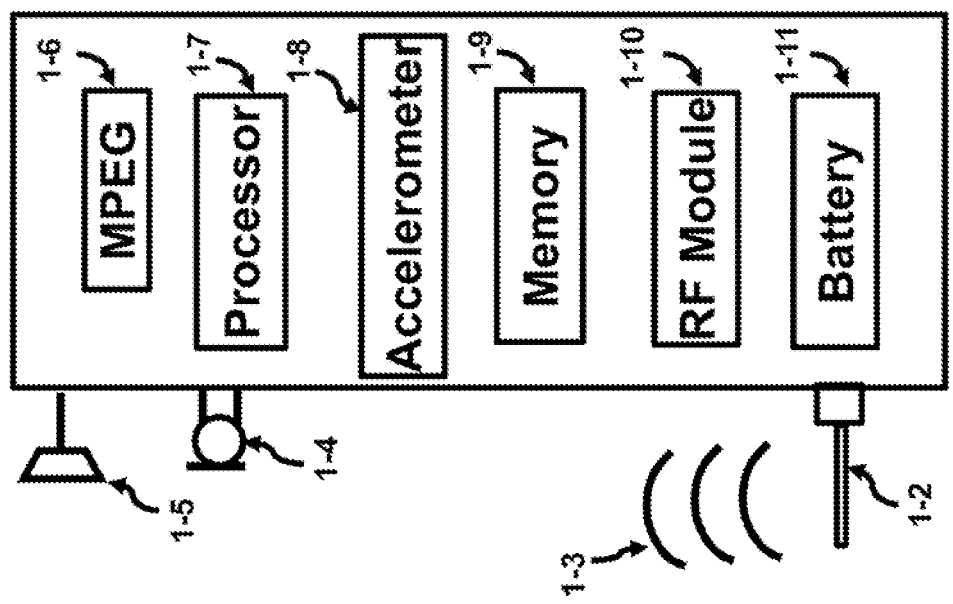

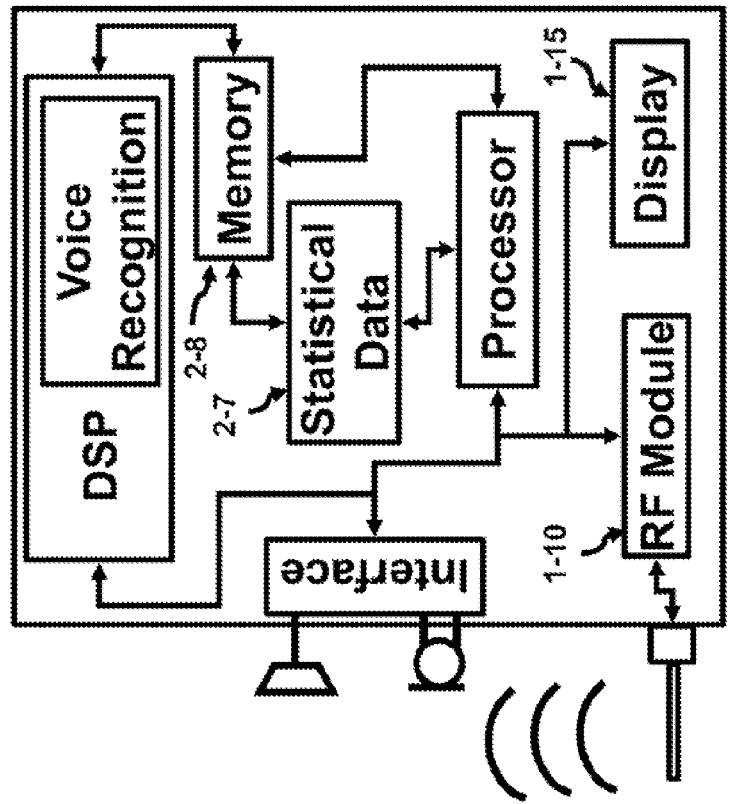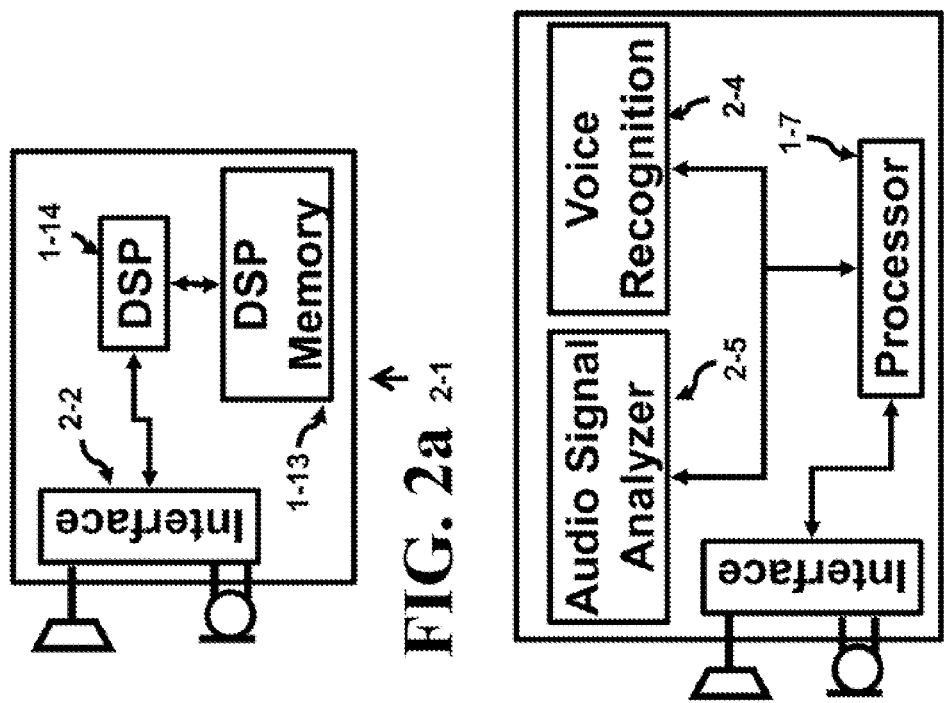

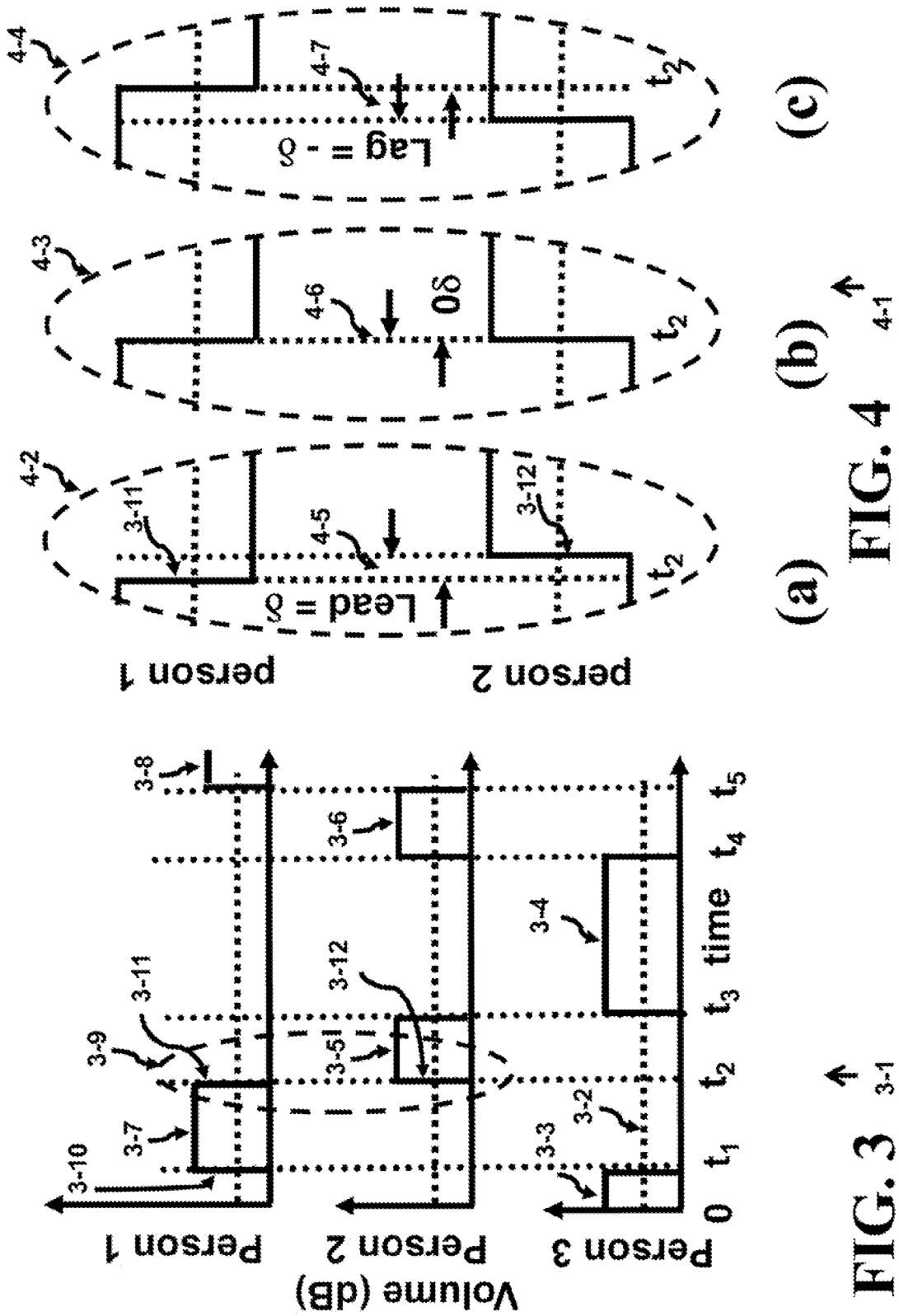

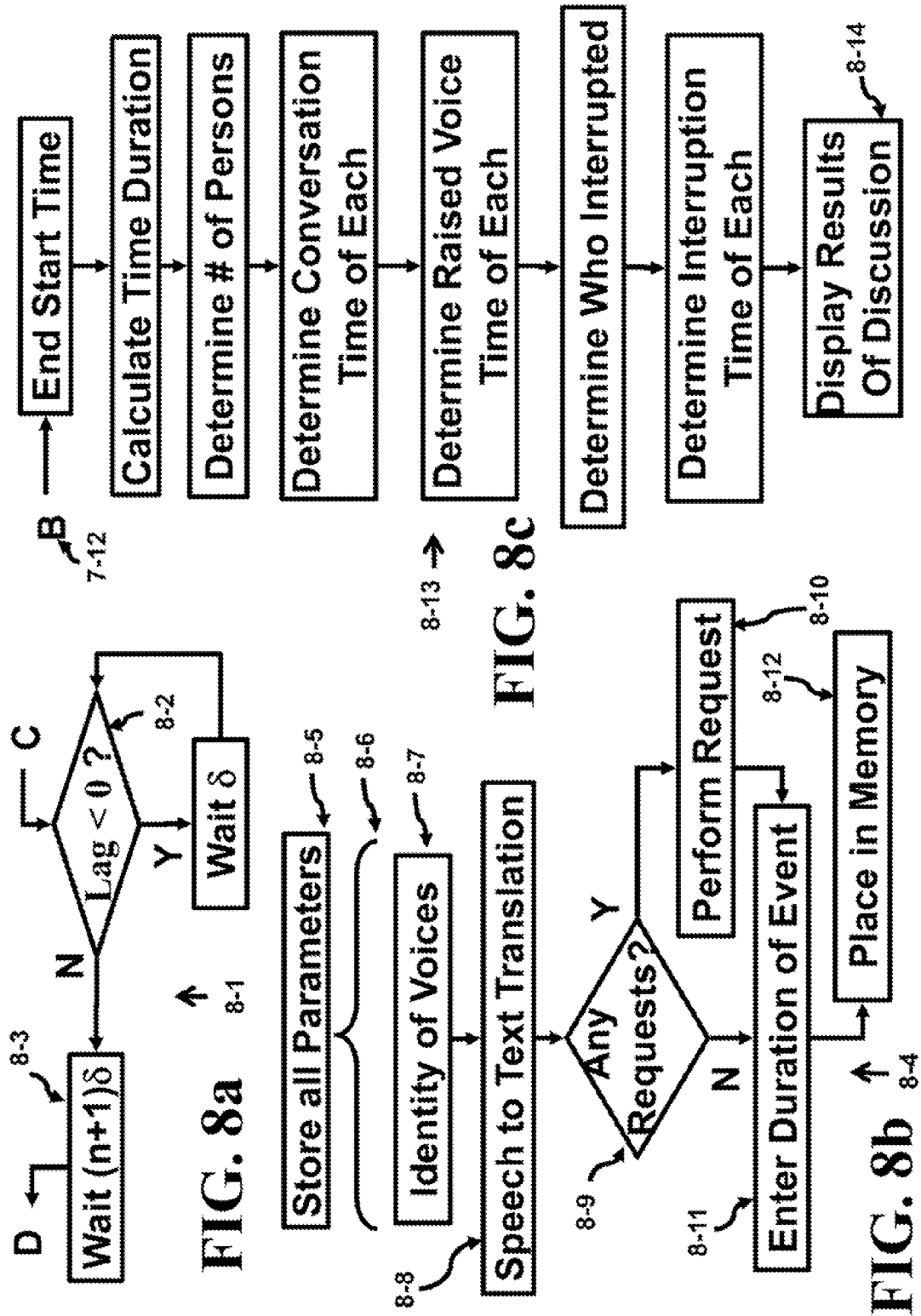

| APP | Function/Task |
|---|---|
| Meaning of next word | Provides meaning of word |
| Fast Talker | Identifies a faster talker |
| Train Volume of Voice | Trains to reduce volume of voice |
| Timer to Hold Floor | Gives a Person a block of time |
| Beep for curse words | System beeps after someone curses |
| Stop Whispering | System asks person to speak up |
| Grammatical correction | Identifies what needs to be corrected |
| Background noise | Removes persistent background noise |

FIG. 11   11-1

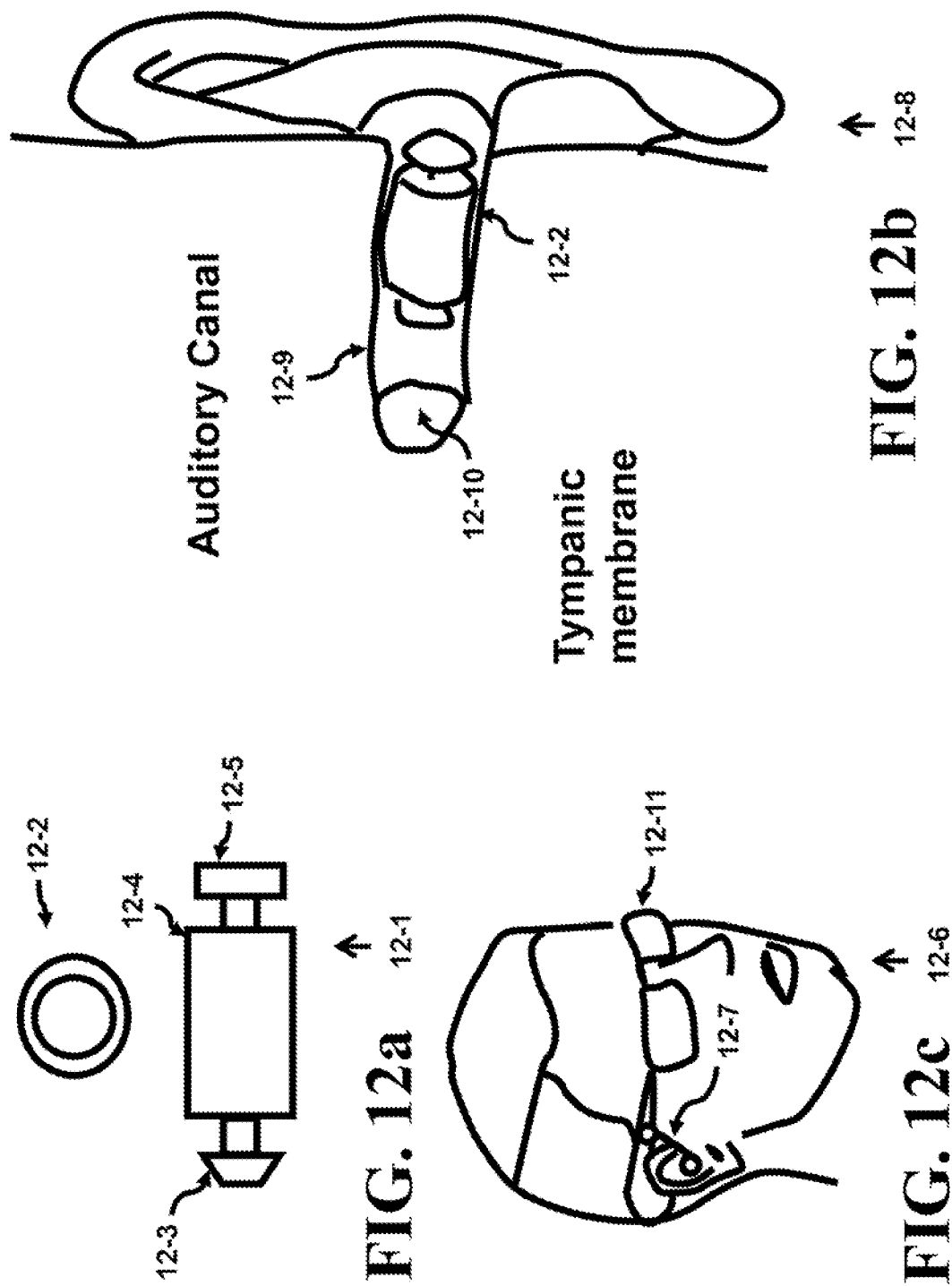

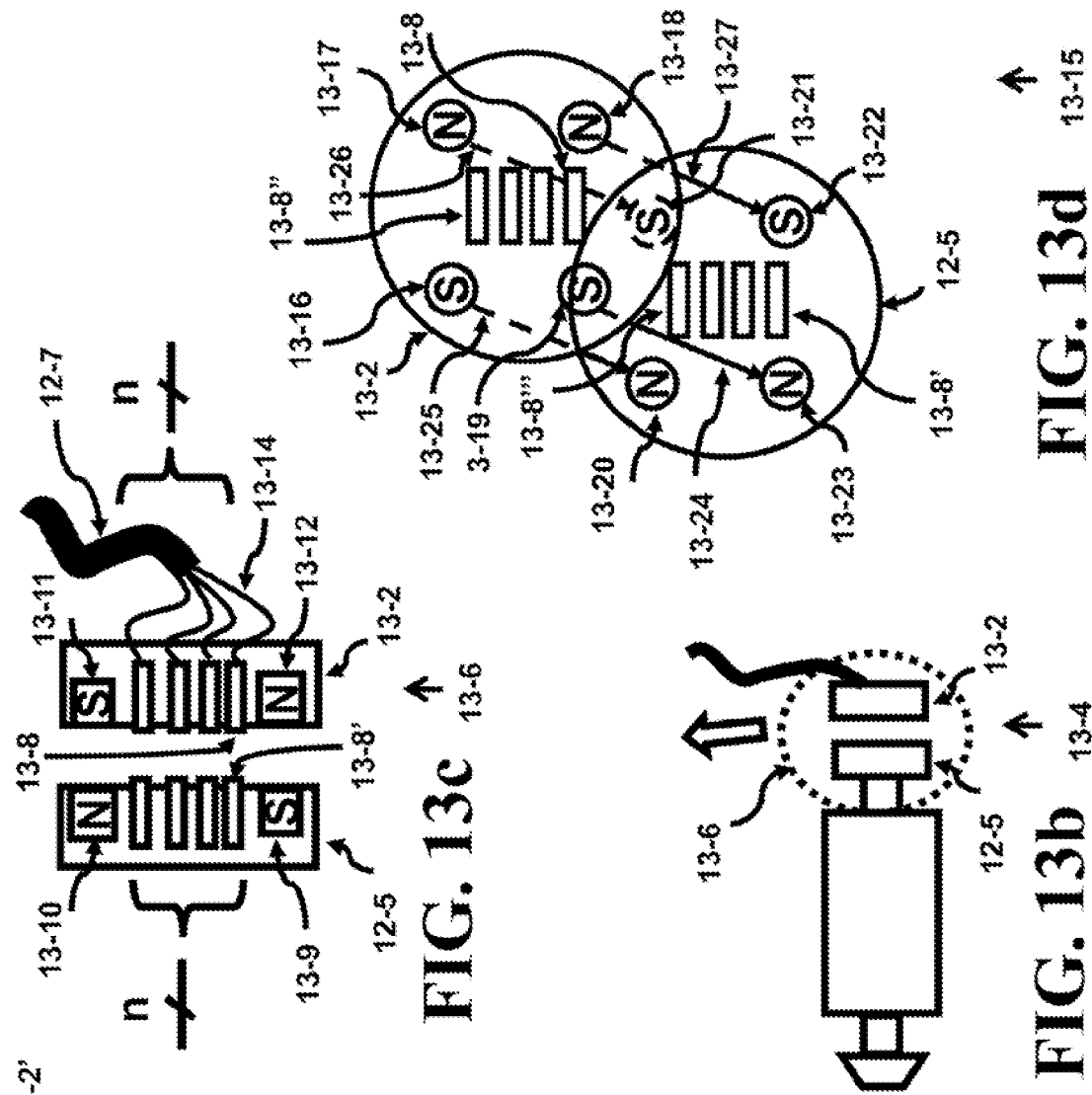

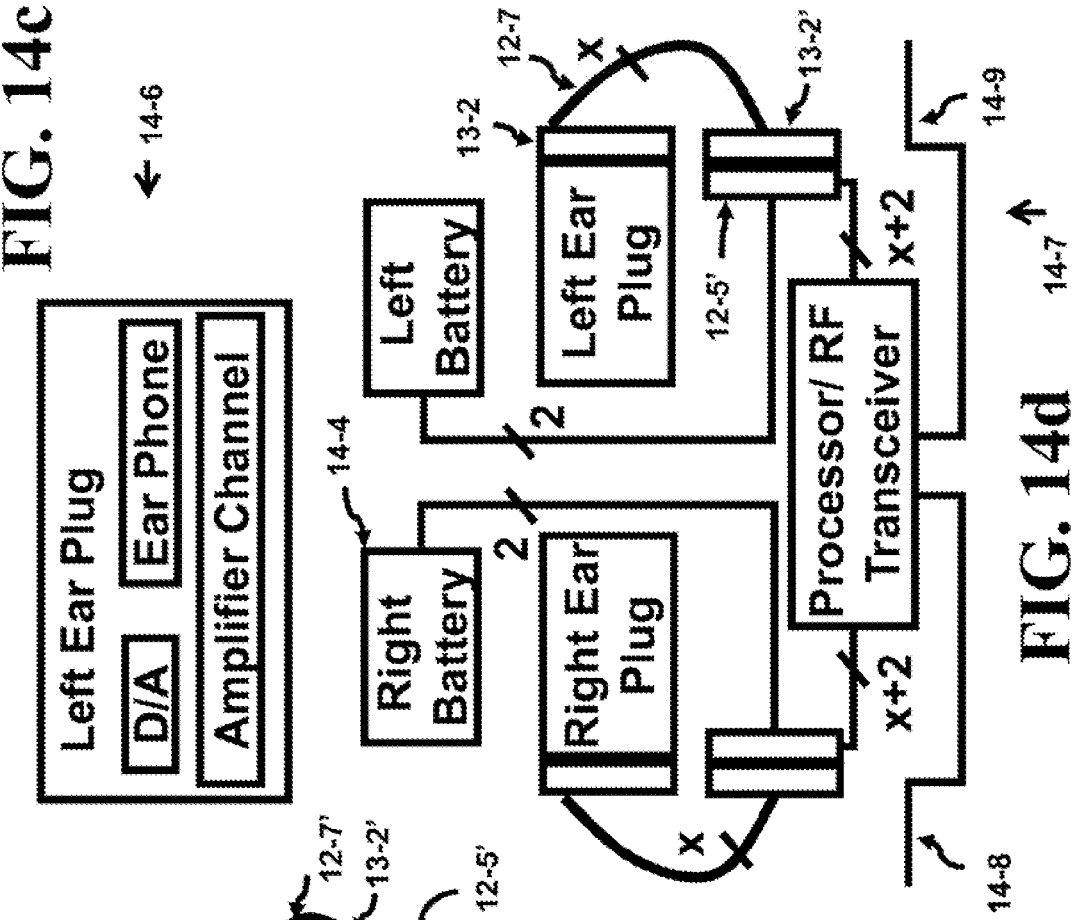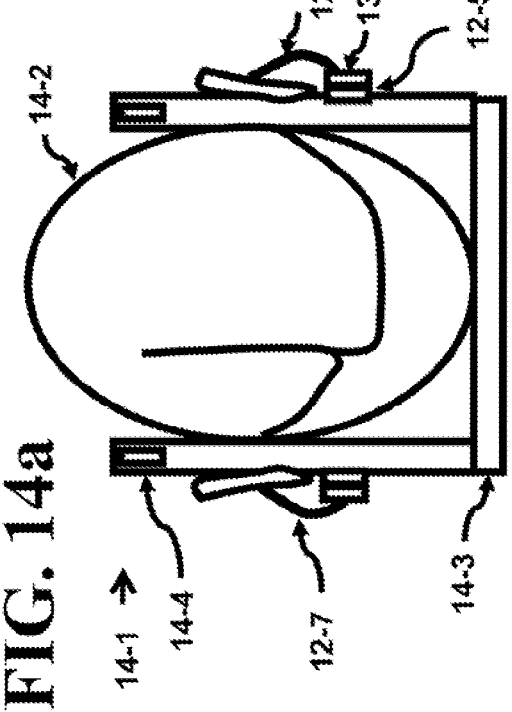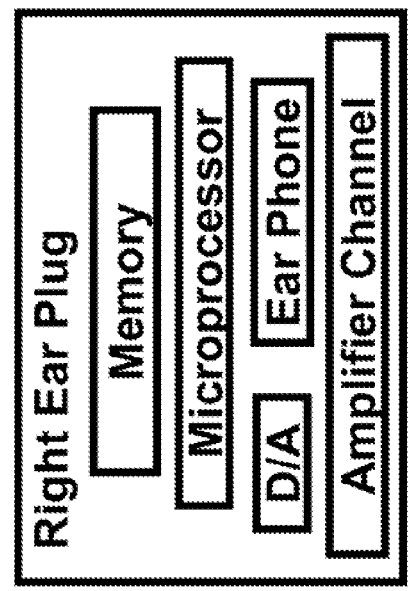

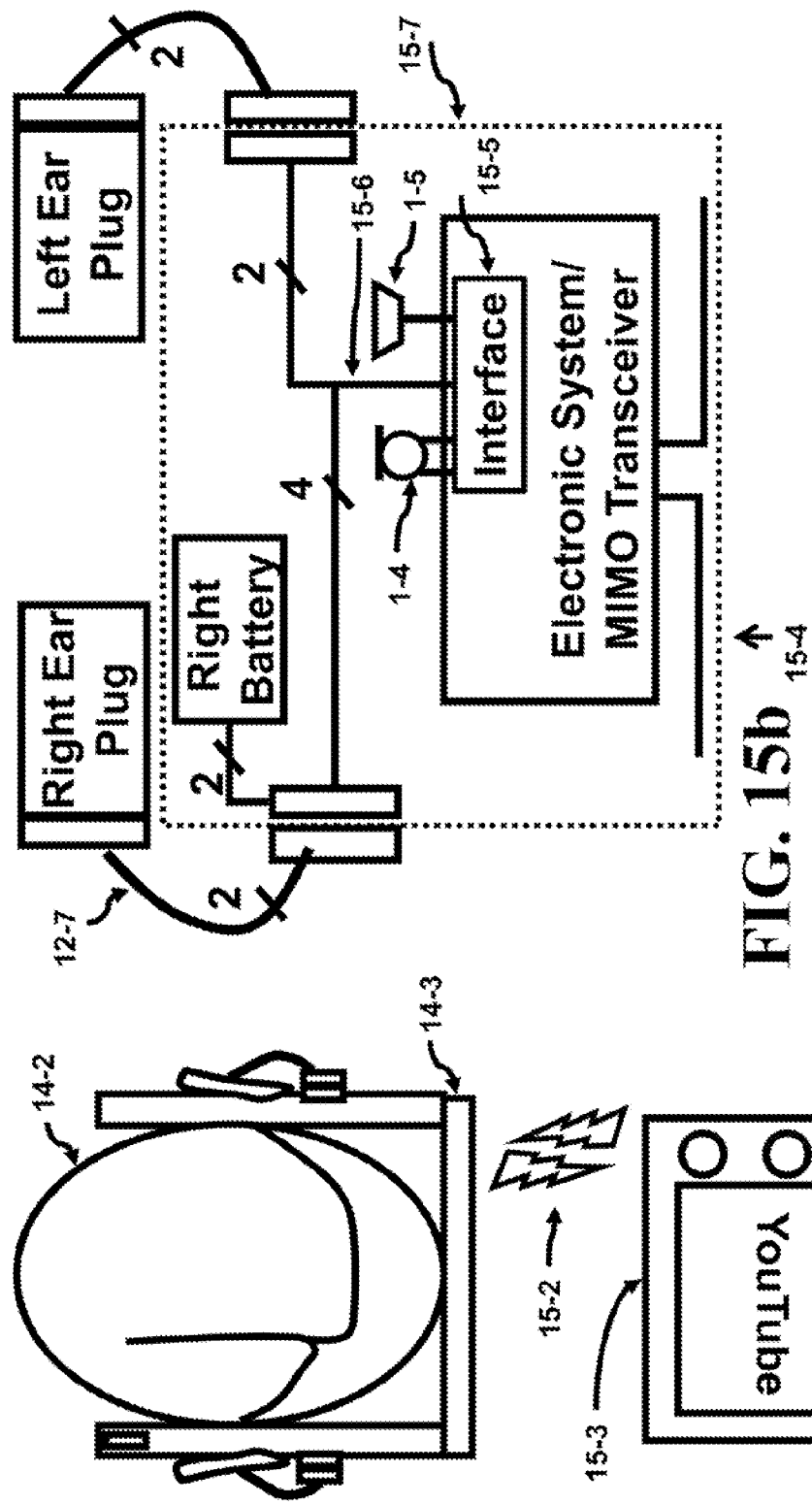

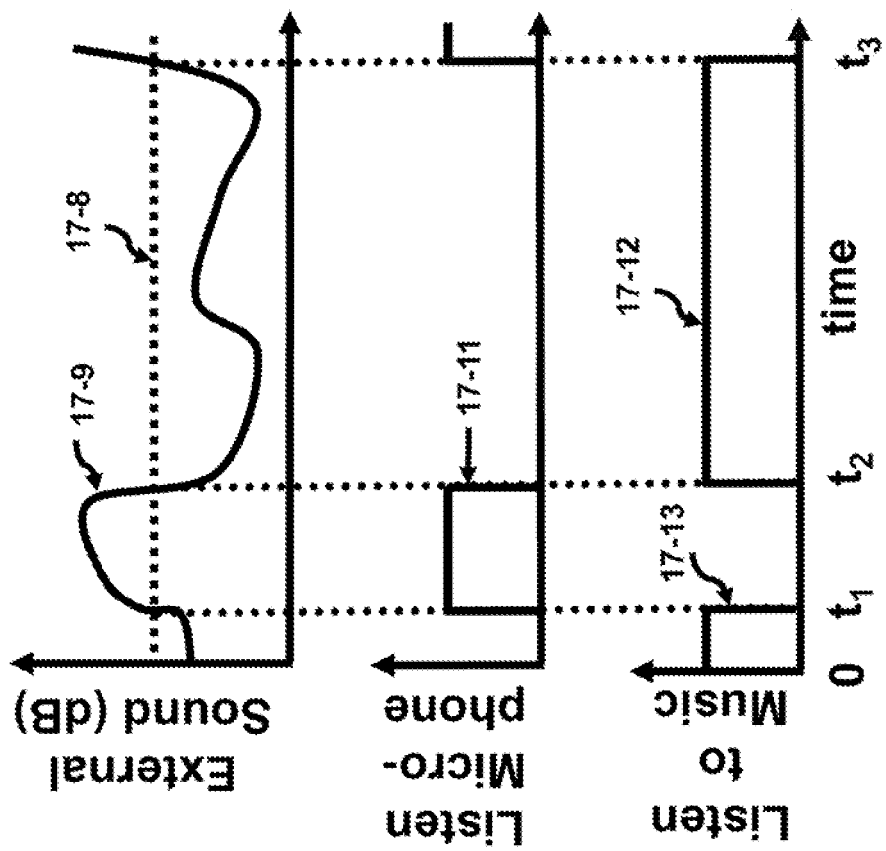
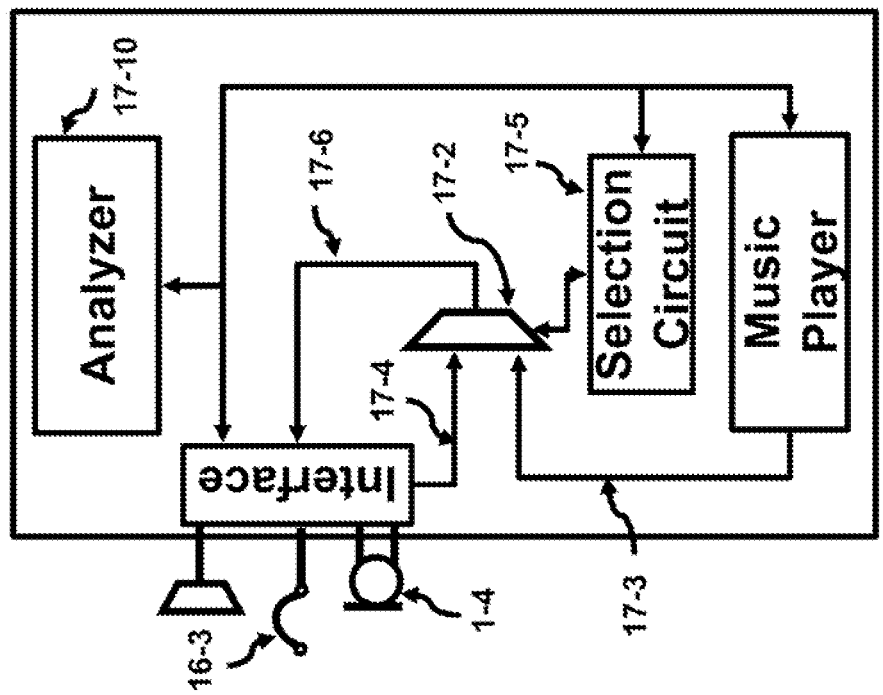
FIG. 17b
FIG. 17a

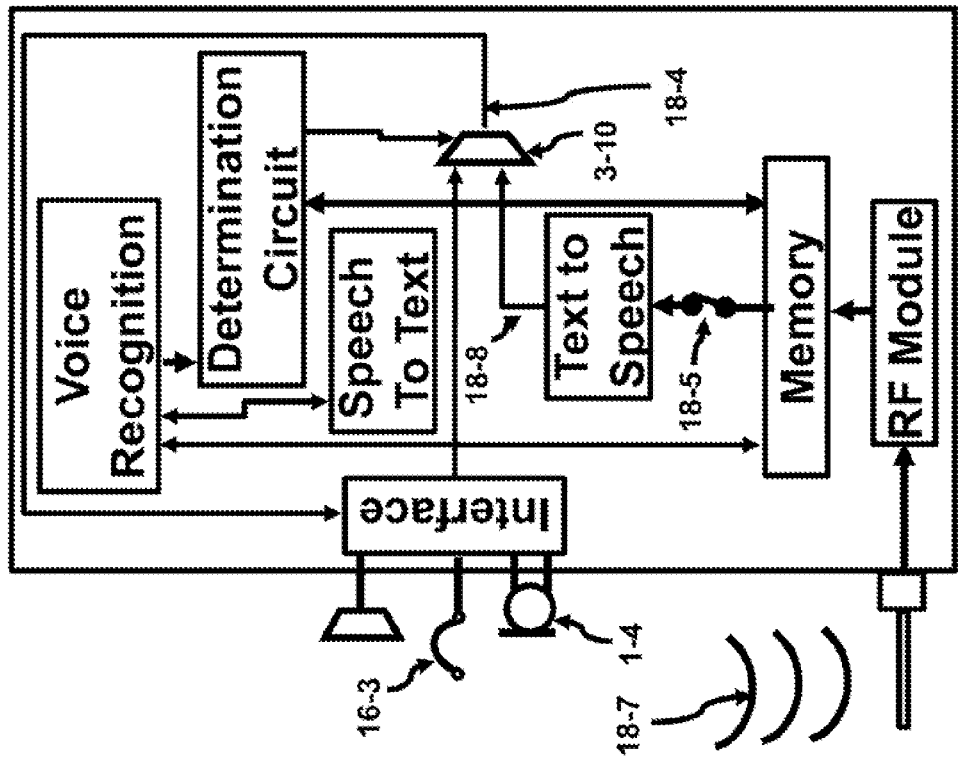
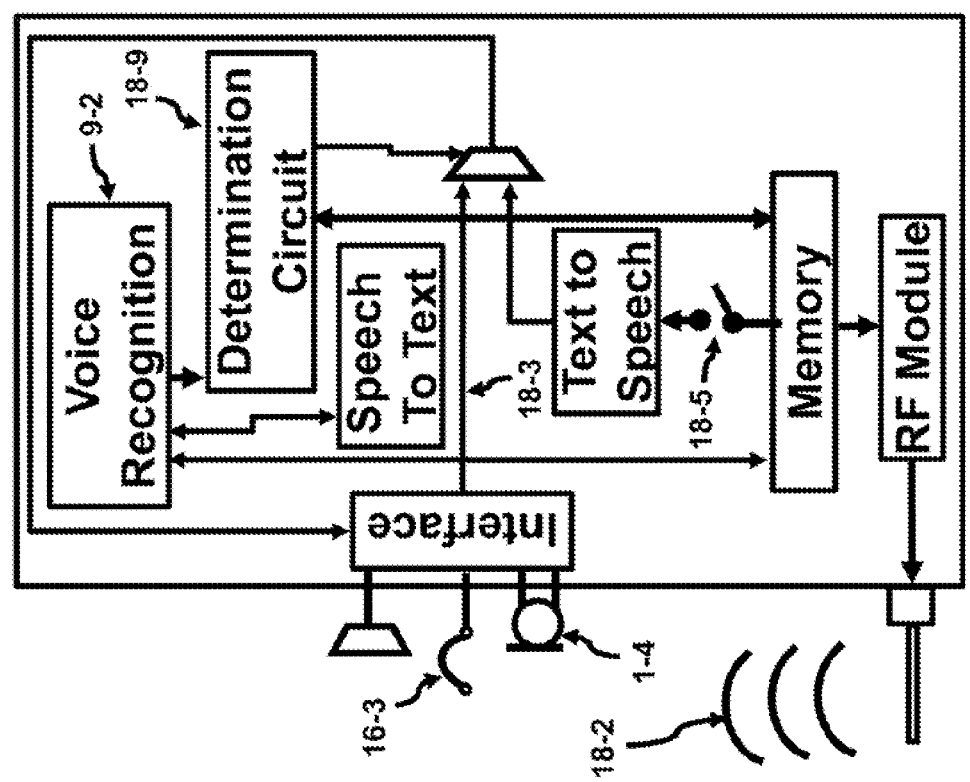
FIG. 18a
FIG. 18b

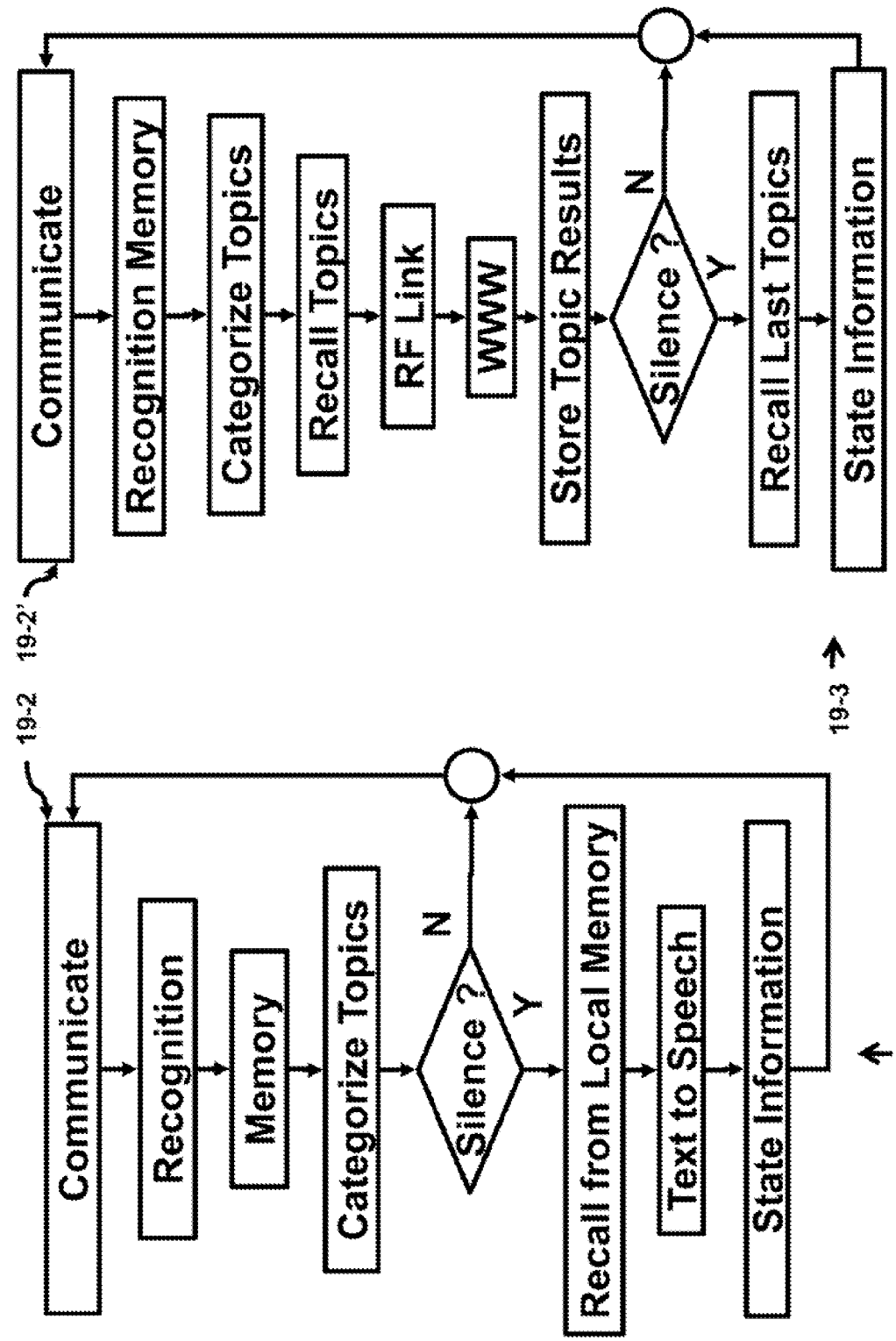

METHOD AND APPARATUS FOR OBTAINING INFORMATION FROM THE WEB

CROSS-REFERENCE TO RELATED APPLICATIONS

The present application is a continuation of application Ser. No. 13/013,886, filed on Jan. 26, 2011, entitled "Method and Apparatus for Obtaining Statistical Data from a Conversation" which is invented by at least one common inventor as the present application and is incorporated herein by reference in their entireties. The present application filed on Jul. 11, 2014 is related to the two co-filed U.S. applications entitled "Apparatus for Aiding and Informing a User" with application Ser. No. 13/013,903 filed on Jan. 26, 2011 and "Apparatus for Electrically Coupling Contacts by Magnetic Forces" with application Ser. No. 13/013,895 filed on Jan. 26, 2011, and invented by at least one common inventor as the present application and incorporated herein by reference in their entireties.

BACKGROUND OF THE INVENTION

During a conversation within a group, arguments occur because of a misunderstood word, a misheard Word, lazy listening, interruptions, or someone commanding large portions of the conversation. This leads to raised voices, obscenities and further interruptions.

A portable wireless system is a device that contains many different blocks that are used to perform several functions. For example, portable wireless systems include the iPod from Apple Computer Inc. or the Android phone from Google. In addition, the portable wireless system can be customized to perform a particular function such as reading, a book in a device called Kindle from Amazon.

The iPad and Android phone use Apps (Application software) loaded into the portable wireless system to perform functions or tasks. Similarly, the App's software can be downloaded as an App to a person's portable system to benefit and aid the person in performing functions or tasks.

BRIEF SUMMARY OF THE INVENTION

A first embodiment uses a system (for example, a portable wireless cell phone downloaded with this inventive App) to monitor various parameters of a conversation, for example distinguishing voices in a conversation and reporting who in the group is violating the proper etiquette rules of conversation. These results would indicate any disruptive individuals in a conversation. So they are identified, monitored, trained to prevent further disturbances, and their etiquette is improved to prevent further disturbances. Some of the functions the system can perform include: report how long one has spoken, report how often one interrupts, report how often one raises their voice, count the occurrences of obscenities and determine the length of silences.

In another embodiment, a system can provide meaning of words, send email, identify fast talkers, train to reduce the volume of a voice, provide a period of time to a speaker, beep when someone uses a profanity, request a voice to speak up, provide grammatical corrections, provide text copies of conversation, and eliminate background noises. These are features that could help improve the operations of a group in communication. Such an application can be carried out with a portable wireless system or in a telephone conference call.

The inventive technique utilizes voice recognition, speech to text, and other blocks emulating various Finite State Machines (FSM) that can be used to interact with the conversation. Other embodiments of this invention can be used in condition with music players, stored audio recordings, web browser results or interact radio output.

Another embodiment is a portable system consisting of components that are magnetically and electronically coupled together. The electronic coupling allows signals and power/ground to couple between the various components. The magnetic coupling allows the portable system to come apart without damaging the components when an element of a component gets unexpectedly snagged after passing, an obstacle. The components can be easily collected and reassembled to reconstruct the system. Furthermore, the positioning of the magnets in the magnetic coupling provides a lock and key combination in that the pattern and anti-pattern between mating surface couplings can be designed to only allow one orientation when the units are coupled. This restriction in orientation prevents the power leads from shorting to ground or other signal leads during the reassembly thereby preventing damage to the system.

In yet another embodiment is an apparatus that allows the user to interact with an electronic system, such as a music player, and be notified when a potentially dangerous situation may be occurring the immediate vicinity of the user. This is particularly important when the user is listening to music using a loud volume setting thereby making the user oblivious to any dangerous conditions or situations surrounding them, for example, a car beeping at an intersection. The apparatus monitors the surrounding environment while the user is listening to their music and interrupts the user's interaction with the music player and redirects the user's attention to the audio of the newly determined potentially dangerous situation. The user decides on the urgency of this situation, decides what needs to be done, and responds as they see fit.

Another embodiment relates to an apparatus comprising: a voice recognition block to distinguish voices in a conversation; a memory to store the voices of the conversation; a statistical data unit that determines parameters of the voices in the conversation; and an interface coupled to a transducer that presents the determined parameters, whereby a training period is used to recognize each voice, whereby the parameters are selected from the group consisting of reporting the identity of the voices in a conversation, reporting how long the voices in a conversation have spoken, reporting how often the voices in a conversation interrupt, reporting how often the voices in a conversation exceed the minimum level, reporting how often the voices in a conversation uses obscenities and reporting how often the voices in a conversation are silent. The apparatus whereby each of the voices in the conversation stored in the memory has a tag according to the determined parameters, further comprising: a time stamp associated with each tag, whereby the transducer is selected from the group consisting of speaker, display and earphone; and the determined parameters of the voices in the conversation are presented to a user of the apparatus. The apparatus further comprising: an audio signal analyzer used to cancel background noise.

Another embodiment relates to an apparatus comprising: a voice recognition system to distinguish each voice in a conversation; a speech to text converter to convert at least one voice of the conversation into text; and a request circuit to interpret the text for a command, whereby the command is performed, whereby a training period is used to identify each voice, whereby the commands are selected from the group consisting of providing meaning of words, sending email, identifying fast talkers, training to reduce the volume of a voice, providing a period of time to a voice, beeping after someone uses a profanity, requesting a voice to speak up, providing grammatical corrections, providing text copies of conversation, and eliminating background noises, whereby each of the voices in the conversation stored in a memory and has a tag according to the determined command, further comprising: a time stamp associated with each command. The apparatus further comprising: a transducer to present to a user of the apparatus the determined command; and the transducer is selected from the group consisting of speaker, display and earphone, further comprising: an audio signal analyzer used to cancel background noise.

Another embodiment relates to a method of storing parameters of a conversation comprising the steps of: determining if there is silence in the conversation; distinguishing each voice of the conversation by using a Voice Recognition system; identifying if someone interrupts the conversation; and storing parameters relating to the conversation, whereby the storing step is performed in a memory. The method further comprising the steps of: training the voice recognition system to identify each voice of the conversation, further comprising the steps of: determining a length of time each voice is used in the conversation, further comprising the steps of: determining if any voice of the conversation raises their voice, further comprising the steps of: requesting an unknown voice to identify themselves, further comprising the steps of: requesting an unknown interrupter to identify themselves, whereby the parameters are selected from the group consisting of reporting the identity of the voices in a conversation, reporting how long the voices in a conversation have spoken, reporting how often the voices in a conversation interrupt, reporting how often the voices in a conversation exceed the minimum level, reporting how often the voices in a conversation uses obscenities and reporting how often the voices in a conversation are silent.

BRIEF DESCRIPTION OF THE DRAWINGS

Please note that the drawings shown in this specification may not be drawn to scale and the relative dimensions of various elements in the diagrams are depicted schematically and not necessary to scale.

FIG. 1a shows a portable wireless system containing, components illustrating this inventive technique.

FIG. 1b shows a portable wireless system containing other possible components illustrating this inventive technique.

FIG. 2a illustrates a system with an interface and DSP/Memory illustrating this inventive technique.

FIG. 2b shows a system with an audio signal analyzer and Voice Recognition Block illustrating this inventive technique.

FIG. 2c depicts a wireless system with an addition of a Statistical Data Block illustrating this inventive technique.

FIG. 3 shows the volume waveforms of three persons speaking in a conversation illustrating this inventive technique.

FIG. 4a-c corresponds to the insert 3-9 of FIG. 3. FIG. 4a depicts the volume waveform of person 1 leading the volume waveform of person 2 by δ units given in using this inventive technique.

FIG. 4b illustrates person 1 and person 2 overlapping by 0 units using this inventive technique.

FIG. 4c shows person 1 lagging person 2 by δ units illustrating this inventive technique.

FIG. 8a shows the flow chart of the wait state after an interruption illustrating this inventive technique.

FIG. 8b depicts one possibility of the internal flowchart of the Store All Parameters Block illustrating this inventive technique.

FIG. 8c depicts one possibility of terminating the flowchart illustrating this inventive technique.

FIG. 11 illustrates a table providing various Apps illustrating this inventive technique.

FIG. 12a depicts the side and front view of an ear plug illustrating this inventive technique.

FIG. 12b illustrates the ear plug inserted in the auditory canal illustrating this inventive technique.

FIG. 12c shows a head view of a person wearing a portable wireless system illustrating this inventive technique.

FIG. 13a depicts the ear plug inserted in the auditor canal and coupled to the eyeglass illustrating this inventive technique.

FIG. 13b illustrates the ear plug coupled to the wire 12-7 illustrating this inventive technique.

FIG. 13c shows a close up of the magnetic connector cord proving electrical tact illustrating this inventive technique.

FIG. 13d depicts the relative position of the magnetic connector cord and orientation during contact illustrating this inventive technique.

FIG. 14a shows a top view of a person wearing the portable wireless eyeglass system illustrating this inventive technique.

FIG. 14b illustrates the components in the right ear plug illustrating this inventive technique.

FIG. 14c depicts the components in the left ear plug illustrating this inventive technique.

FIG. 14d shows the Electronic Block Diagram of the eyeglass illustrating this inventive technique.

FIG. 15a shows a top view of a person wirelessly interacting with a web page on a second device illustrating this inventive technique.

FIG. 15b shows the Electronic Block Diagram of the eyeglass illustrating this inventive technique.

FIG. 15c depicts the components in the right/left ear plug illustrating, this inventive technique.

FIG. 17*a* illustrates another perspective of a block diagram of the system that disables the music player when the external audio signals are loud illustrating this inventive technique.

FIG. 17*b* depicts the external volume and whether the user is listening to the music or the microphone illustrating this inventive technique.

FIG. 18*a* shows a block diagram of one embodiment of the system that sends out the last several discussion topics to the web illustrating this inventive technique.

FIG. 18*b* shows the block diagram of the system that receives additional information about: the last several discussion topics from the web illustrating this inventive technique.

FIG. 19*a* shows a flow chart that recalls the last few topics from local memory illustrating this inventive technique.

FIG. 19*b* shows a different embodiment of a flow chart that recalls the last few topics from the web illustrating this inventive technique.

DETAILED DESCRIPTION OF THE INVENTION

Figure 5:
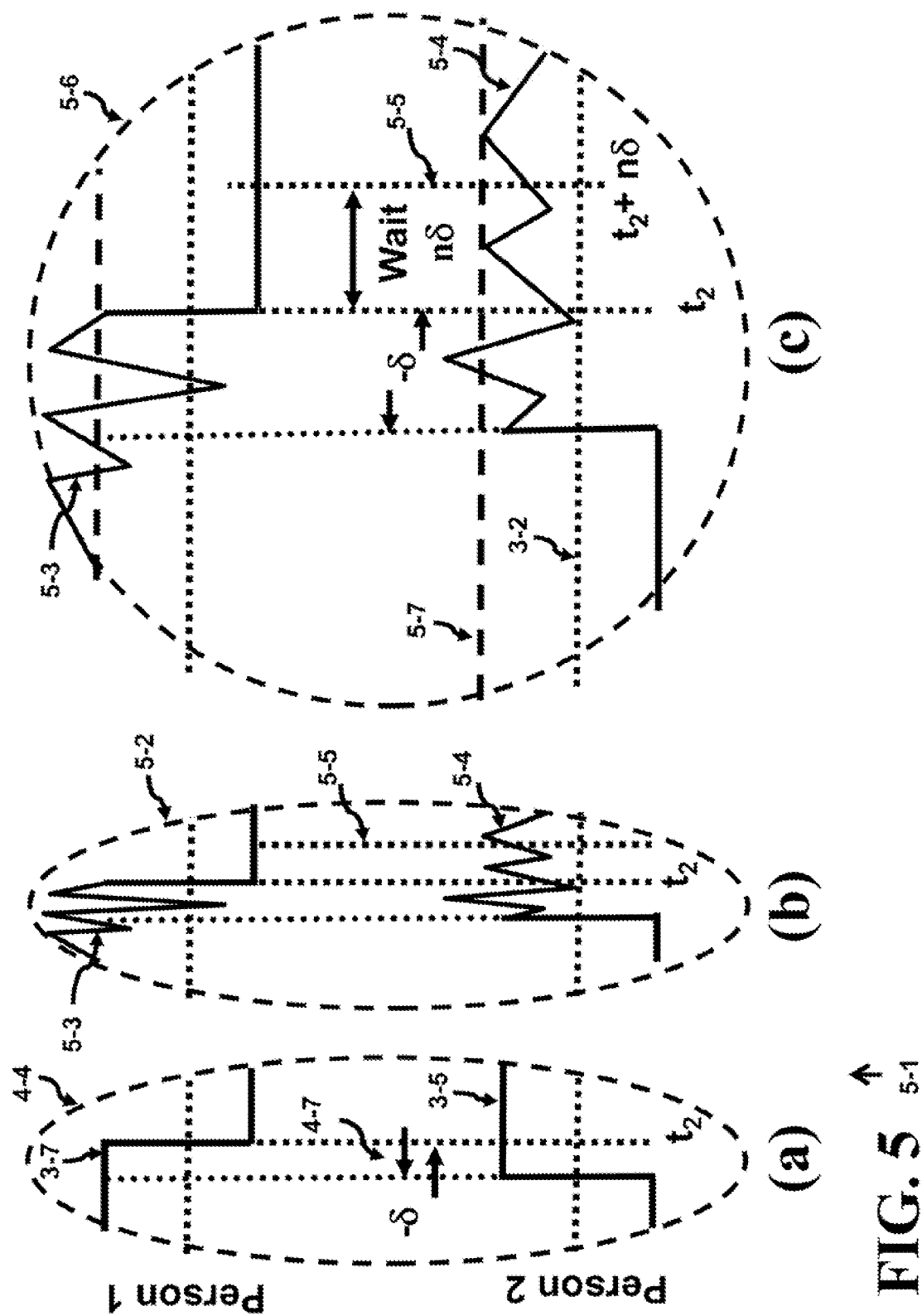
FIG. 5a depicts the lagging waveforms given in FIG. 4c illustrating this inventive technique where persons 1 and 2 maintain a constant volume level when talking.
FIG. 5b shows this inventive technique where persons 1 and 2 present varying volume levels when talking. Noise is also included if not filtered.
FIG. 5c shows the time magnified view of FIG. 5b illustrating this inventive technique.

This inventive embodiment incorporates a system that is used to analyze a conversation held between two or more people. The system provides a detailed summary of the results of a conversation including but not limited to: reporting the identity of the voices in a conversation, reporting how long each of the voices in a conversation has spoken, reporting how often the voices in a conversation interrupt, reporting how often the voices in a conversation raise their voice, reporting how often the voices in a conversation speak obscenities and reporting how often the voices in a conversation are silent.

The system contains all the required components to extract the content of the verbal discussion of a group. The content is further segregated according to which person was talking, who remained silent, who dominated the conversation, etc. These are all features that could help improve the operations of a group in communication. Such an application can be carried out in a multiple of systems. For example, the invention can be used in a portable wireless system or in a telephone conference call.

Another embodiment of a wireless system 1-1 is illustrated in FIG. 1*a*. The system could also be portable and handheld. Like numbers refer to like elements throughout. An antenna 1-2 can transmit/receive radio signals 1-3. The system also has a microphone 1-4 and a speaker 1-5. Earphones (not illustrated) can be used as a listening device and will be presented later. The system also comprises several blocks (only a sub-set shown) such as the MPEG (Motion Picture Experts Group) Block 1-6 which can be used to process video and also includes one of the audio coding schemes such as AAC (Advanced Audio Codec). A. Processor Block 1-7 handles some of the data processing, scheduling and additional controlling issues. The Accelerometer Block 1-8 can be used to detect orientation and movement. A Memory Block 1-9 holds the data, software routines such as Apps, boot up routines and configuration data. The RF Module (Radio Frequency) Block 1-10 contains all the transceiver components to drive and respond to the signals of an antenna 1-2. Finally, a Battery 1-11 is used to power the system. Although, in some cases, a power cord to a wall outlet can provide power or a source of energy.

Additional embodiments can be achieved by replacing the conversation monitoring program with other functions or tasks as will be described later. Examples include: providing meaning of words, sending email, identifying fast talkers, training to reduce the volume of a voice, providing a period of time to a voice, beeping after someone uses a profanity, requesting a voice to speak up, providing grammatical corrections, providing text copies of conversation, and eliminating background noises.

Another version of a portable handheld system 1-12 is shown in FIG. 1*b*. Internally, a DSP (Digital Signal Processing) Memory Block 1-13 is used in conjunction with the DSP Block 1-14. The Memory Blocks 1-9 and 1-13 are just one example of a way to partition the memory. Various other methods to integrate the memory components together to perform specific tasks are possible. For example, one large memory can be used to combine all the individual memories into one, although the performance of the system may be impacted. Another example is to segregate the memories from each other and provide distinct memories to each Processing/DSP Block. The handheld system can also contain a Display 1-15 and a Camera 1-16. Also the system has at least one A/D D/A (Analog to Digital, Digital to Analog) Block 1-18 along with Converter Block 1-19 and an Audio Amp Block 1-17. The DSP Block. 1-14 can be used to process digital signals available from the conversation after their analog audio signals are translated into digital format by the A/D Block 1-18. In addition, a Speech to Text Block coverts the speech directly into text (not illustrated). The Display 1-15 serves as one of the interfaces to the system.

FIG. 2*a*-*c* illustrates several portable handset systems that utilize DSPs to analysis voice and audio signals. In FIG. 2*a*, the system 2-1 comprises an interface Block 2-2 that interfaces any signal that enters or leaves the system. In FIG. 2*a*, the interface Block 2-2 interfaces the microphone and speaker to the internal blocks of the system. Some additional examples include; display screens, antennas, or earphones. In this case, the internal blocks shown are the DSP Block. 1-14 and its Memory Block 1-13. The DSP Block contains components that can process digital signals of voice very efficiently. Voice signals received from the microphone are analog in nature. The diagrams are simplified such that many blocks that are required are not illustrated in order to simplify the diagrams. For example, not illustrated in the FIG. 2*a* are the A/D and D/A Blocks that are used to convert the analog voice signals into digital voice signals (for the DSP) and vice versa.

In FIG. 2*b*, the system 2-3 contains a Processor Block 1-7 coupled to the Interface Block, an Audio Signal Analyzer Block 2-5 and a Voice Recognition Block 2-4. The Voice Recognition Block 2-4 is used to recognize voice or speech received from the microphone, translate the voice into text, and identify the individual. In the process of identification of the voices, when a voice is being analyzed, the voice is compared with previous samples of voice recordings that are stored in memory (not shown). If there is a match, the voice is assigned the name provided in the memory. Otherwise, if a match is not made, the system will ask for an identity of the person. The system then stores the name into memory with components of the voice characteristics for future reference. The Audio Signal Analyzer Block 2-5 is used to eliminate any background noise that the system may be receiving thereby providing better voice quality for the system to capture. For instance, if there is a constant hum in the background, the system can use the audio signal analyzer to null the constant hum out.

FIG. 2c shows a Processor Block coupled to a DSP Block in a system 2-6. The DSP Block with the Voice Recognition Block 2-4 can be used together to identify or distinguish the different voices in a conversation. Once these voices are identified and the Memory Block 2-8 is used to permanently store data related to the different voices in the conversation or temporarily hold data during calculations. The additional block in this system is called the Statistical Data Block 2-7. The Statistical Data Block accesses the Memory Block 2-8 to provide statistics concerning the conversations the system 2-6 has been analyzing. The Statistical Data Block 2-7 is used with the Processor Bock and Memory Block 2-8 to provide information or statistics such as: reporting the identity of the voices in a conversation, reporting how long, the voices in a conversation have spoken, reporting, how often the voices in a conversation interrupt, reporting how often the voices in a conversation exceed the minimum level, reporting how often the voices in a conversation uses obscenities and reporting how often the voices in a conversation are silent. The Processor Block couples these parameters of the voices in a conversation to the Interface Block. The Interface Block sends the results to a transducer, such as, the Display Block 1-15, the speaker or RE Module Block.

FIG. 3 illustrates three different people speaking in a conversation 3-1. The vertical axis displays the volume of each person in dB. The horizontal axis corresponds to time. Several times are provided: 0, and t1-t5. The horizontal dotted line 3-2 in each graph corresponds to the minimum volume that the system will detect. Starting from time=0, person 3 speaks till $t_1$. The persons 1 and 2 during this time interval are below the minimum volume; thus the system will not detect these two persons. In another embodiment, a second lower level (not shown) can be set to determine if the person is whispering. However, the amplitude 3-3 of person 3 during this time period is greater that of the minimum 3-2 so the system can detect the voice of person 3. The information for person 3 is stored in memory where the memory has a tag identifying that this portion of memory is related to person 3. This information includes: length of time speaking, volume of speaker, etc. In the next interval, $t_1$ to $t_2$, person 1 talks. Person 1 initiates his discussion by increasing their volume along the rising edge 3-10 until the volume remains at a constant amplitude as indicated by the horizontal line 3-7. Finally, person 1 completes their discussion at $t_2$ and decreases their volume along the falling, edge 3-11. The information for person 1 is stored in memory where the memory has a tag identifying that this portion of memory is related to person 1. In the third interval, $t_2$ to $t_3$, person 2 initiates their discussion by increasing their volume along the rising edge 3-12 until the volume remains at a constant amplitude as indicated by the horizontal line 3-5. The information for person 2 is stored in memory where the memory has a tag identifying that this portion of memory is related to person 2, as performed in the previous intervals for the other persons. The next interval, $t_3$ to $t_4$ shows person 3 speaking at the volume 3-4. Finally, in the last interval, $t_4$ to $t_5$, person 2 is speaking at volume 3-6. Note the dashed oval 3-9, encompasses a portion of the amplitude 3-7 and the falling edge 3-11 of person 1 and amplitude 3-5 and the rising edge 3-12 of person 2. In particular, the overlap or lack therein between the falling edge 3-11 and the rising edge 3-12 is further illustrated in the magnified images 4-1 provided in FIGS. 4a-c. Since time is the independent variable, the time associated with the previous intervals is recorded and used to determine the total duration of the various parameters.

FIG. 4a illustrates a magnified version 4-2 of the oval 3-9 in FIG. 3. The falling edge 3-11 leads the rising edge 3-12 providing a lead gap 4-5 of. That is, when person 1 stops talking, there is a gap of 6 seconds before person 2 starts to talk. The value of a typical gap δ between speakers is set to about a second. If the gap δ is one second or less, then person 2 is considered to be interrupting person 1. In the magnified version 4-3, the relationship between the falling edge 3-11 and the rising edge 3-12 is adjusted to have a gap 4-6 that decreases to zero as shown in FIG. 4b. Just as person 1 utters the last word, person 2 starts talking. Lastly, in 4-4, the filling edge 3-11 of person 1 lags the rising edge of person 2 as illustrated by the lag gap 4-7 of −δ in FIG. 4c. In this case, both persons 1 and 2 are both talking simultaneously and in this case, |−δ| can vary from $0^+$ seconds and higher. FIGS. 4b and 4c offer a pictorial representation of identifying when interruptions occur. Two or more interrupts can occur simultaneously. In some cases, the identity of the interrupters can be determined by analyzing the voice characteristics of each voice during an interruption when each of the interrupters has the loudest voice for a short period of time. The system can request certain speakers to remain silent. Or if the identity cannot be made, the system can ask for order in the conversation to be restored.

The horizontal lines 3-7 and 3-5 in the lagging gap case 4-4 of FIG. 5a indicates that the two persons are always speaking using a constant volume during their period of discussion. This is typically not the case in real life. FIG. 5b, replaces the ideal horizontal lines 3-7 and 3-5 with the jagged lines 5-3 and 5-4 as illustrated in the view 5-2 to present the more realistic waveforms corresponding to the variations of volume levels of the two persons. In some cases, these realistic waveforms can be averaged over time and presented as a constant over this time period. A magnified version of 5-2 is provided in 5-6 of FIG. 5c. The more realistic waveforms are expanded and several new demarcations are illustrated.

The first demarcation is the dashed line 5-7 in each set of waveforms. This represents the maximum volume level above which one would be considered to be raising one voice if exceeded for a certain minimum time period. Another is the vertical dotted line 5-5 that is placed nδ units after $t_2$ where one of the persons has stopped talking. And as indicated earlier, line 3-2 provides the minimum volume a person should have in order to be heard or identified by the system.

After an interruption, where in this case, the interrupter carries the conversation, the delay may take a little longer to recover the conversation. Thus, the n in nδ would be greater than or equal to 1 in order to ensure that there are no more interrupters. Once the value of δ has been set (usually to one), the system can proceed to determine the length of the conversation. However, if the interrupter is subdued, then the volume of the interrupter would decrease as the volume of the interrupted voice increases. This latter case is not illustrated but would also need a time slightly greater than nδ to recover the conversation.

Figure 6:
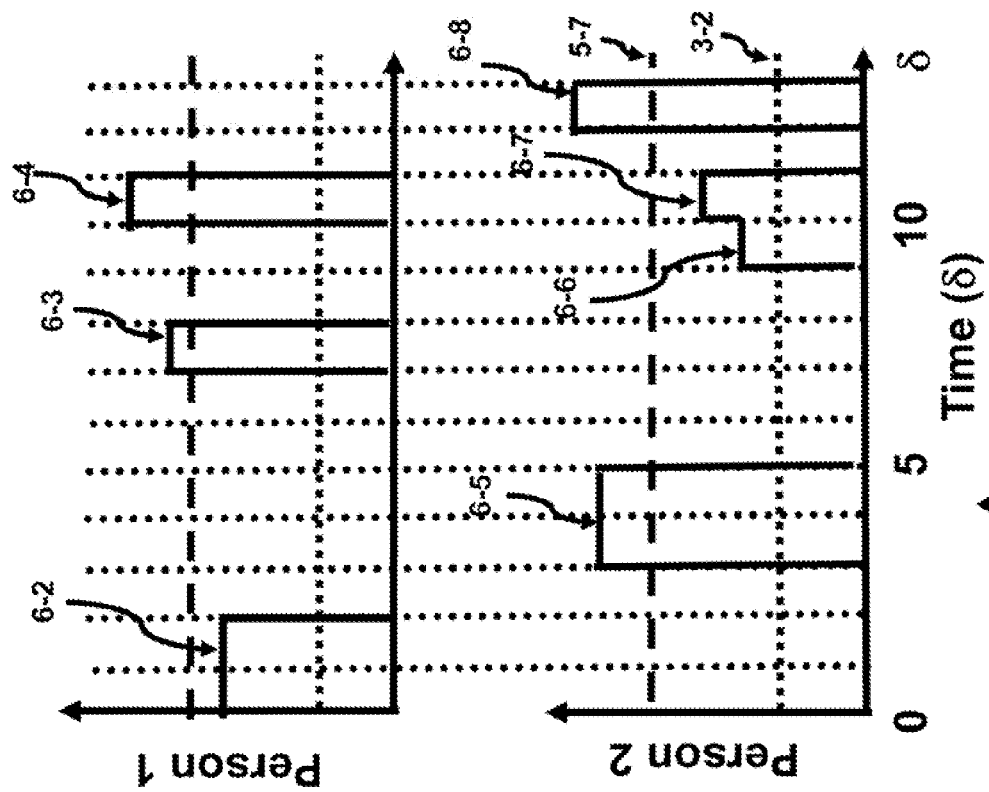
FIG. 6a illustrates the volume waveforms of two persons in a conversation incorporating this inventive technique.
FIG. 6b shows a table displaying the results of a conversation between the two persons in FIG. 6a using this inventive technique.

Although the waveforms in FIGS. 5b and 5c are more realistic, the averaged horizontal lines will be used in the waveform 6-1 given in FIG. 6a to simplify the presentation without complicating the diagram. FIG. 6a illustrates a conversation between two persons. Person 1 speaks between 0 δ-2 δ at a first volume level of 6-2. A period of silence occurs between 2 δ and 3 δ. Then, person 2 raises their voice to a second volume level above the 5-7 maximum line between 3 δ to 5 δ. Another period of silence occurs between 5 δ and 7 δ. Between 7 δ and 8 δ, person 1 raises their voice to a third volume level 6-3 above the level 5-7. Another gap of silence between 8 δ and 9 δ. Person 2 then raises their voice to a fourth volume level 6-6 between 9 δ and 10 δ. Person 2 then increases to a fifth volume level 6-7 between 10 δ and 11 δ while person 1 interrupts and raises their voice to a sixth volume level 6-4, simultaneously. After a recovery period of δ between 11 δ and 12 δ, person 2 raises their voice to the volume level 6-8 between 11 δ and 12 δ after which the conversation ends.

FIG. 6*b* illustrates a tabular format 6-9 which provides the action performed and its duration. δ is set equal to 1 second. In total there are 4 seconds of silence including the one after the interruption. The person 1 holds a conversation for 3 seconds, disregarding the period during the interruption between 10 δ and 11 δ while person 1 raised their voice for 2 seconds. In the case for person 2, the conversation was held for 4 seconds again disregarding the interruption and person 2 raised their voice for 3 seconds. Person 2 never interrupted while person 1 interrupted for 1 second.

Figure 7:
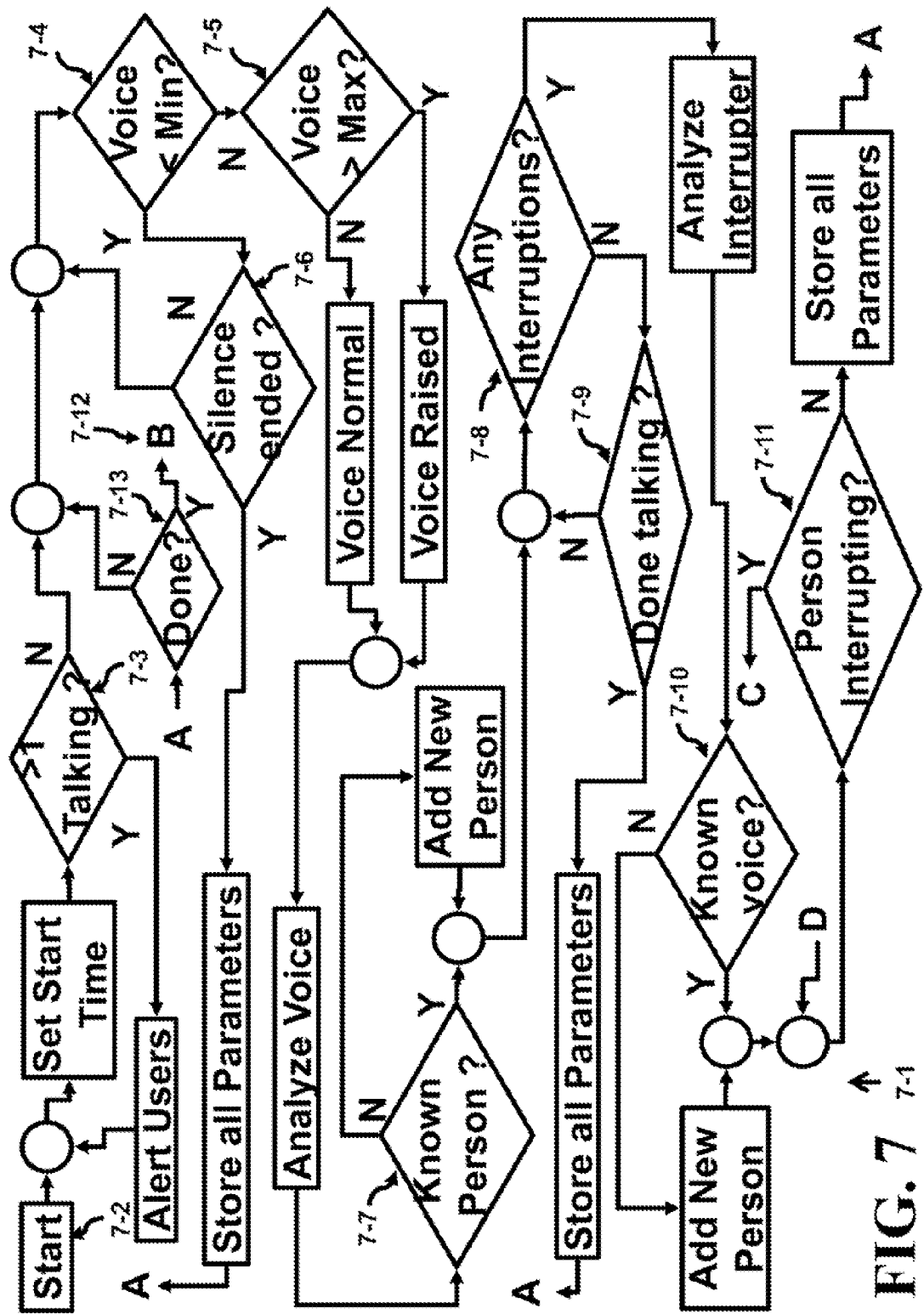
FIG. 7 depicts a flowchart obtaining and storing parameters from a conversation illustrating this inventive technique.

The flowchart 7-1 in FIG. 7 presents one embodiment of a method that can determine the duration for each of the various actions given in FIG. 6*b* in an actual conversation. Note that any references to the elements of the flowchart, those elements are italicized. Similar embodiments for flowcharts, although not shown, can be generated for those that have quiet voices counting the obscenities or if someone whispers. Apps provide one way of downloading software into a system that represents one of the embodiments of the flowchart. The Apps are available by downloading the software either by the use of a tape, magnetic storage, memory stick, on-board memory, DVD or even wirelessly.

The system begins at Start 7-2 and proceeds to the Set Start Time. The >1 Talking Decision 7-3 determines if more than one person is talking. If so, move to Alert Users so that the start of a new conversation measurement evaluation can about to begin. Then once the flow returns to >1 Talking Decision 7-3, if only one person is talking then proceed to the Voice Min Decision 7-4 to see if the voice is less the minimum level (see 3-2 in FIG. 6*a*). If so, there is silence, the duration is measured until the silence is broken. The flow then moves to Store all Parameter and then the data regarding this and all silence periods are stored after which the flow moves to A. The Done Decision 7-13 determines if the conversation is done, if not then proceed to Voice Min Decision 7-4. If the volume of the voice is greater the minimum volume, move to Voice Max Decision 7-5 to see if the volume of the voice is greater than the maximum volume. In either case, identify if the voice is normal or raised in volume after passing through either Voice Normal or Voice Raised, then proceed to Analyze Voice. Here the voice is matched against the known voices in the database in Known Person Decision 7-7. If none of the voices are matched, then move to Add New Person and add this new person into the database. The system requests the information directly from the new person by asking the new person to identify themselves which is part of the training period. The interactions to the system can be either voice controlled (speech) or physically controlled (keyboard, mouse, etc). The system has voice recognition in the DSP or processor and the system asks for the identity of the new person during a period of silence so the system can write their identity into the memory.

The next step is to move to Any interruptions Decision 7-8 to ask if any interruptions have occurred. If not, then continue monitoring the talking until the current person is done talking. Once the talking is complete move to Store all Parameters, then store all the parameters into memory after which the flow moves to A. However, if there have been interruptions at Any Interruptions Decision 7-8, then the system would move to Analyse interrupter and then move to Known Voice Decision 7-10. Here the voice is matched against the known voices in the database. If none of the voices are matched, move to the Add New Person Block and then add this new person into the database. The system identifies the name of the interrupter by having, the system request the information directly from the interrupter or someone else in the conversation.

Once the identity of the interrupter has been determined, the flow moves to Person Interrupting Decision 7-11 and asks if the person is still interrupting. If not, then move to Store All Parameters and store in the corresponding memory space all the parameters into memory. The flow then moves to A. If the person is still interrupting passing in Person interrupting Decision 7-11, then move to C (given in FIG. 8*a*). In FIG. 8*a*, the flow enters Lag Decision 8-2 of the partial flowchart 8-1. If the Lag is less than 0, move to Wait Hand then wait for a time period of δ and check again. Once Lag is greater than 0, move to Wait (n+1) to 8-3 and wait an additional δ (n=0) or more (n>0). Then move to D (in FIG. 7). The flowchart in FIG. 8*a* starts during the interruption. The system waits at least one δ or more before proceeding to Person interrupt Decision 7-11 again. If there are no interruptions, then store all the parameters in the corresponding memory space for the interrupted person into memory.

If after returning to Done Decision 7-13, the conversation is complete and one flows to given in FIG. 8*c* in the flowchart 8-13. The clock is stopped. In End Start Dine, allowing the determination of the total time for the conversation in Calculate Dine Duration. The number of persons in the conversation is summarized in Determine of Persons. The software determines the length of time each person: controls the conversation time (Determine Conversation Time of Each), raises their voice (Determine Raised Voice Time of Each), interrupted others in the conversation (Determine Who Interrupted) or was the recipient of an interruption (Determine Interruption Time of Each). The Display Results of Discussion 8-14 provides the results of all the statistical data on a screen or is announced verbally by the portable system.

In FIG. 7, there are several occurrences of Store All Parameters. In FIG. 8*b*, the flowchart 8-4 provides one embodiment of the flow within Store All Parameter 8-5. First, the voices are identified and segregated in Identity of Voices 8-7, then Speech To Text Translation 8-8 translates the voice into text so the content of the statements in the conversation can be evaluated. The text is analyzed to see if any of the persons in the conversation desired the system to perform a specific request in Any Requests; Decision 8-9, if so, the system performs these requests in Perform Request, the flow then continues to Enter Duration of Event where the duration of each of these events is calculated. Finally, control moves to Place in Memory so that the statistical data concerning the conversation such as the period of silence, the duration of conversation by each person, the number of times a person raises their voice or interrupts is placed into the memory of the system and can be stored and/or displayed on a screen.

Figure 9B:
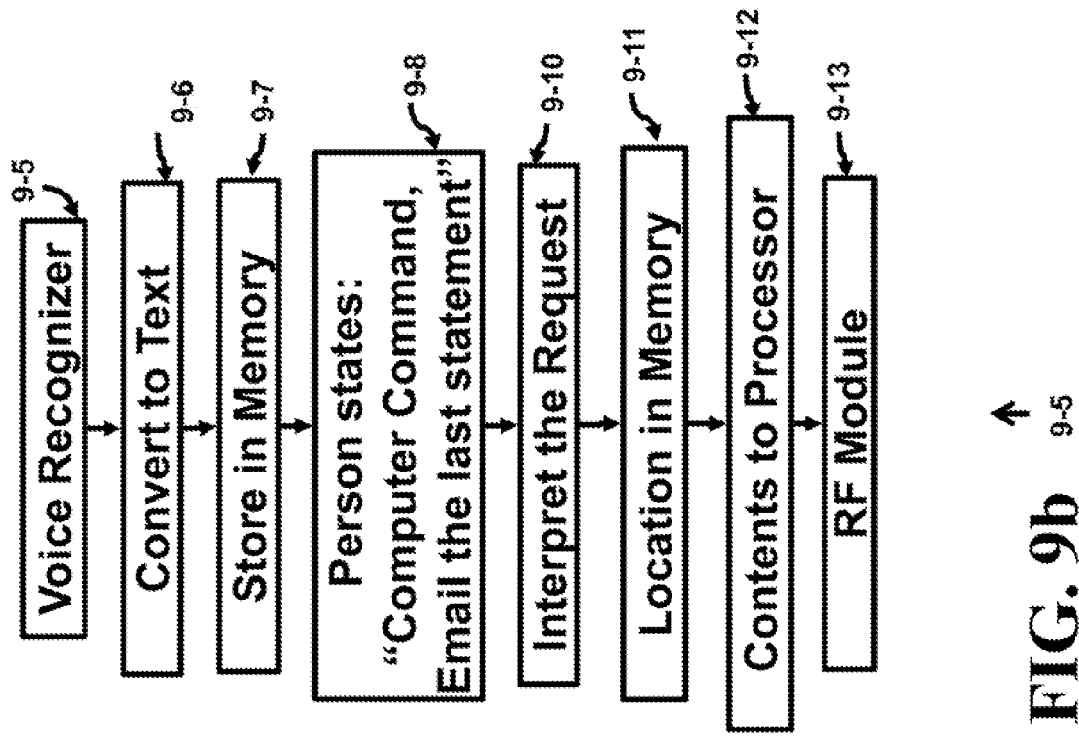
FIG. 9b illustrates a flowchart to respond to sending an email using verbal commands illustrating this inventive technique.
Figure 9A:
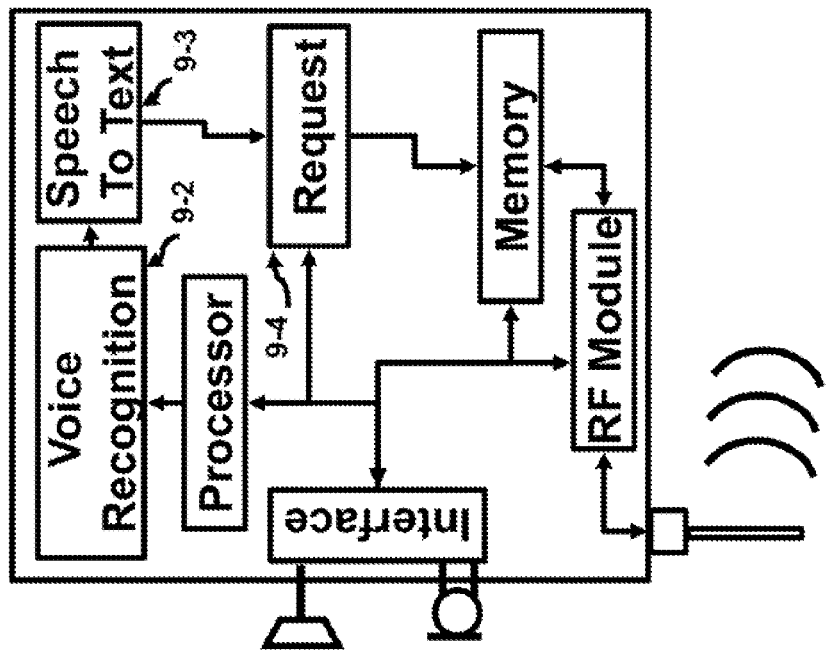
FIG. 9a shows a wireless system with a speech to text and request circuit to perform a function illustrating this inventive technique.

An example of a system 9-1 to perform a request is provided in FIG. 9*a*. The conversation of the group enters the Processor Block through the Interface Block. The Voice Recognition Block 9-2 performs voice recognition and can perform additional analysis (volume amplitude, A/D and D/A, etc). The speech is applied to the Speech to Text Block 9-3, and the text is applied to the Request Block 9-4 that interprets a command. Here the Request Block looks for the command statement which is then followed by the desired request.

An example is provided in the flowchart 9-5 provided in FIG. 9*b*. The conversation is applied to Voice Recognizer 9-5 which performs the characteristics mentioned in the previous paragraph. The voice is passed to Convert to Text 9-6 and Store in Memory 9-7. The text format allows the recognition that the Person states "Computer Command. Email the last statement" 9-8. The person may think that the last statement discussed was important and wants a record of the last statement sent to their email. The term "Computer Command" is recognized by the system which understands that the immediate statement following this command is a function that the person wants performed. The immediate statement following the command is "Email the last statement." The system flows to Internet the Request 9-10 to decipher the last statement to determine the request. Once the request is understood, the last statement and the determined task is stored in memory in Location in Memory 9-11 and sent to Content to Processor 9-12 to create the email. Finally, the email is sent using the RE Module 9-13.

Figure 10B:
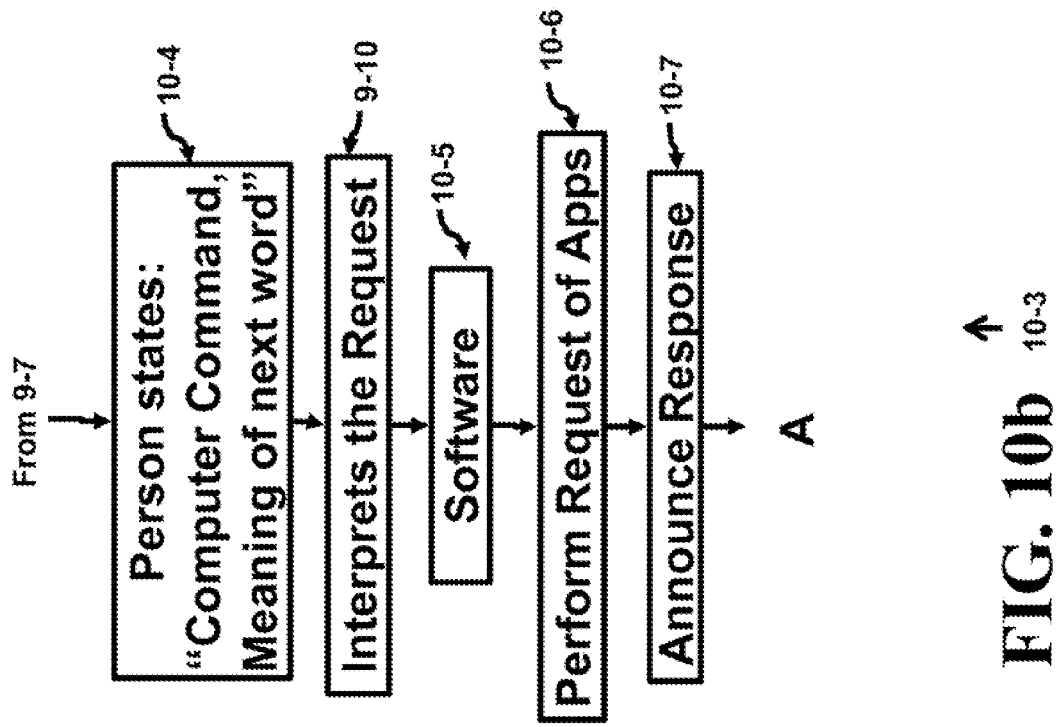
FIG. 10b shows a flowchart to provide the meaning of a word illustrating, this inventive technique.
Figure 10A:
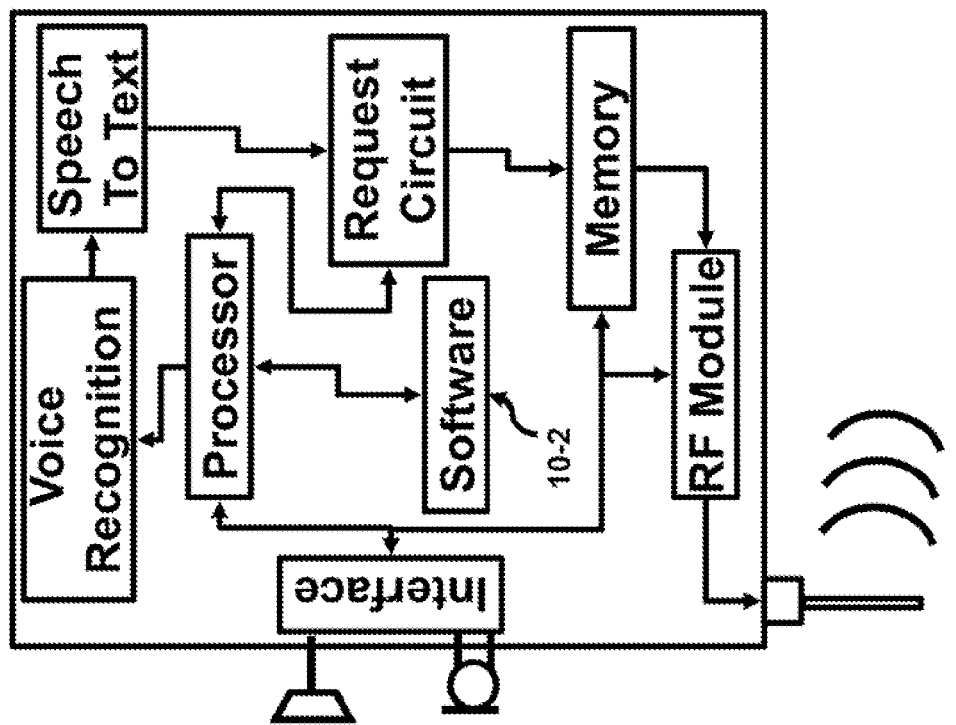
FIG. 10a depicts a wireless system with a software component to perform a function or task (called Apps) illustrating this inventive technique.

Another embodiment of a system 10-1 is provided in FIG. 10*a*. All blocks are similar as to the system given in FIG. 9*a* except for the addition of the Software Block 10-2. The Software Block can occupy a section of memory and contain the Apps. Once one of these Apps is invoked to perform a function or task, the program in the software Apps is performed by the processor to create the requested function or task.

FIG. 10*b* gives another embodiment for a flowchart 10-3. This time the flow moves to Person states "Computer Command, Meaning of the text word" 10-4. As before, the term "Computer Command" is something the system easily recognizes. The system next Interprets the Request 9-10 and then uses Software 10-5 provided by the Apps to Pent in Request of Apps 10-6. Once the meaning of the word is performed, the system flow moves to Announce Response 10-7 which notifies the user verbally or via the display screen.

FIG. 11 depicts a table 114 with a number of requests and the corresponding function that the system performs. These requests would be preceded by the statement "Computer command." The request "Meaning of next word" provides the meaning of the word. The Fast talker identifies the fast talker in the conversation. The request "Train Volume of Voice" provides the ability of the system to train one of the persons to reduce their volume level. The request "Timer to Hold Floor" provides a person with a specified amount of time, for example, 30 seconds, to command the floor. The "Beep for curse words" identifies any spoken curse words and attempts to beep them out by inferring their context within the given statement. The request "Stop Whispering" determines the person that has the lowest overall volume and the system requests that: they increase their volume. The request "Grammatical correction" analyzes the statement following this phase and provides corrections if necessary. Finally, the last request illustrated is "Background noise" which causes the system to identify non-human voices and determine if that noise can be eliminated. Once the noise is eliminated, the conversation can be heard or stored in memory. Many other requests can be created if desired.

FIG. 12*a* illustrates two views 12-1 of an ear plug 12-2 the side view (top) and the front view (bottom) The tip 12-3 is pushed into the auditory canal 12-9 of FIG. 12*b* and the flexible body 12-4 of the ear plug is fitted against the auditory canal. The body 12-4 can contains electronic systems to manipulate signals transferred between the tail 12-5 and the tip 12-3 of the ear plug. The tail 12-5 can contain a microphone (not shown) to pick up external audio signals. The tail 12-5 has a mating surface that can also contain electrical contacts and magnets. The mating surface is held magnetically to a mating surface of a mate (described in detail later). This coupling of the mating surface of the tail to the mating surface of the mate provides power and/or additional signals (sourced from an iPod by Apple Computer Inc., for example) to the ear plug 12-2. These signals in turn can be manipulated by the electronic systems in the body 12-4 and provided to the tip 12-3 which contains a miniature speaker or ear phone. In one embodiment, the ear phone can be fabricated, using MEMS (Micro Electrical Mechanical System) technology.

FIG. 12*b* presents a cross-sectional view 12-8 of the ear plug 12-2 in the auditory canal 12-9. The tip with the miniature speaker or ear phone faces the tympanic membrane 12-10. If external audio signals "leak" around the ear plug 12-2 to by-pass the electrical system, the information that this leaked signal carries can compromise the desired behavior of the ear plug at the Tympanic membrane 12-10. To compensate, in a second embodiment of this invention, noise reduction techniques can be incorporated into the electrical system in the body 12-3 to invert the signal and add it to the leaked signal such that the tympanic membrane 12-10 cannot sense this "leaked" signal.

FIG. 12*c* illustrates a view of a person 12-6 with the ear plug 12-2 in their ear and wearing a set of eyeglasses 12-1.1. Between the ear plug and the set of eyeglasses (hereafter called eyeglass) is a connector cord 12-7 that electronically couples the ear plug to the eyeglass.

FIG. 13*a* depicts a close-up cross sectional view 13-1 of the auditory canal region 13-4, connector cord 12-7 and the eyeglass support region 13-3. The connector cord. 12-7 electronically couples the auditory canal region to the eyeglass support region. The coupling is aided by the ear mate 13-2 and eyeglass mate 13-2' connected to the ends of the connector cord 12-7. The tail 12-5 is coupled to the ear mate 13-2 while the eyeglass tail 12-5' is coupled to the other end of the connector cord 12-7 using the eyeglass mate 13-2'. The eyeglass tail 12-5 couples electronics located in the eyeglass to the electronics located in the ear plug 12-2.

The auditory canal region 13-4 is further illustrated in FIG. 13*b*. Inside the region 13-6, the ear mate 13-2 couples to the tail 12-5. The region 13-6 is further magnified as presented in FIG. 13*c*. The tail 12-5 comprises magnets 13-9 and 13-10 and at least one electrical contact 13-8'. Although the tail shows four electrical contacts, the number could be any integer n. Similarly, the ear mate 13-2 has magnets 13-11 and 13-12 with at least one electrical contact 13-8. Since unlike polarities attract, the magnetic force will pull the tail 12-5 to the ear mate 13-2. Each contact is shown coupled to a wire 13-14 that forms a part of the connector cord 12-7. Similarly, the contacts are coupled to the left of the tip 12-5 to electronics located within the ear plug 12-2.

FIG. 13*d* shows one embodiment 13-15 of how the exposed contacts from 13-8' through 8''' in the tail 12-5 align and couple to the exposed contacts from 13-8 through 13-8" of the ear mate 13-2. These exposed contacts can be raised above the surface of the tail and ear mate and can be coated with a conductive metal such as gold (AU) or some other conductive material that minimizes oxide growth. Once the exposed contacts of the tail and ear mate couple together, a low ohmic contact is made. The exposed contacts of the tail can mate to the exposed contacts of the ear mate because the tail is held to the ear mate by the magnetic forces of attraction. The magnets can be embedded in the tail and the ear mate. Since magnets have a N (North) and a S (South) pole, only the pole lacing the gap between the tail and ear mate is illustrated.

A first pattern of embedded magnets is provided in the ear mate 13-2 comprising magnets S 13-16, N 13-17, N 13-18 and S 13-19. The anti-pattern of embedded magnets is depicted in the tail 12-5 as N 13-20, S 13-21, S 13-22 and N 13-23. The anti-pattern has the same position as the magnets in the first pattern of embedded magnets with the pole of the magnet being replaced by the opposite magnetic pole. The opposite polarities of these two magnet sets causes the tail 12-5 to align with and attract the ear mate 13-2 along the for alignment lines 13-24, 13-25, 13-26 and 13-27 until the exposed contacts of the tail couples with the exposed contacts of the ear mate, lithe exposed contacts 13-8 through 13-8" of the ear mate 13-2 and the exposed contacts 13-8' through 13-8''' of the tail 12-5 have the same relative pattern to the embedded magnets and to each other as shown in FIG. 13*d*, then the exposed contacts of the ear mate 13-2 will couple to the exposed contacts of the tail 12-5 and provide an electrical confining for signals or power leads between the tail and the ear mate.

The magnetic orientation and position of the magnets can be used to ensure that there is only one way for the tail 12-5 to electrically couple to the ear mate 13-2. This magnetic orientation and position prevents power/signal leads contacts from being short circuited or incorrectly coupled. For example, if the ear mate 13-2 in FIG. 13*d* is rotated clockwise 90 degrees, two sets of the magnets attract 13-19-13-20 and 13-17-13-22 while two sets repel 13-16-13-21 and 13-18-13-23. The balance would let the user know that the orientation is not correct. Continuing to rotate the ear mate through the two remaining 90 degree rotations, similar unbalances occur indicating that there is only one orientation (the one shown in FIG. 13*d*) where the magnets attract one another. Many different combinations of magnetic orientation and position patterns can be placed on the tail 12-5 and the ear mate 13-2. The one illustrated in FIG. 13*d* is one of many embodiments.

A top view 14-1 of a person 14-2 wearing the eyeglass 14-3 is illustrated in FIG. 14*a*. The battery 14-4 is housed in the eyeglass and would provide power to the system (electronic, mechanical or both) in the eyeglass and via the connector cord 12-7 provides a source of energy to the ear plug to drive an ear phone. In addition, the eyeglass tail 12-5' is coupled to the eyeglass mate 13-2' providing power and signals to both ear plugs (in the left and right auditory canals) of the person 14-2 via two separate connector cords 12-7 and 12-7'.

A block diagram of the right ear plug 14-5 is provided in FIG. 14*b* while the block diagram of the left ear 14-6 is shown in FIG. 14*c*. Each ear plug comprises a D/A (Digital to Analog) Block, an Ear Phone Block that may contain a miniature speaker. An Amplifier channel Block amplifies the audio signal. Furthermore, one of the Ear Plugs, in this case the Right Ear Plug, holds additional components such as the Microprocessor Block, Memory Block, or any additional Blocks that may be required.

The block diagram 14-7 in FIG. 14*d* provides interconnectivity between the following components: Ear Plugs, Batteries, antenna, and the Processor/RF Transceiver Block. The Left and Right Batteries 14-4, right and left eyeglass mate 13-2', Processor/RF Transceiver Blocks, and antennas 14-8 and 14-9 are contained in the eyeglass. The antenna and Processor/RIP Transceiver Blocks intercepts wireless signals to provide audio stimulus to the Ear Plugs. The Left and Right Ear Plugs are in the auditory canals of the person 14-2. The left connector cord 12-7 couples the eyeglass mate 13-2' to the ear mate 13-2. The right connector is similar in structure. In one embodiment, the connector cord 12-7 cab be replaced with a wireless connection. In that case, the power considerations may require that the ear plugs contain their own power source.

FIG. 15*a* presents another embodiment 15-1 of the invention. The person 14-2 wearing the eyeglass 14-3 is viewing a portable system 15-3 that is displaying some web content (YouTube, for example). A wireless link 15-2 is established between the portable system 15-3 and the eyeglass 14-3. This wireless link 15-2 can be used to carry the audio from the portable system 15-3 to the user using the ear plugs that are coupled to the eyeglass 14-3.

FIG. 15*b* illustrates another embodiment of a block diagram 15-4 of the eyeglass system. In this embodiment, the only component in the Right/Left Ear Plugs 15-8 is the ear phone as shown in FIG. 15*c*. All remaining components in the ear plug were moved to the Electronic System/MIMO Transceiver Block, of FIG. 15*b* and incorporated into the eyeglass. Only one battery is used, the MIMO (Multi Input Multi Output) antenna with the transceiver allows greater wireless throughput. The Interface Block 15-5 has an added transducer interconnect 15-6 that couples the Ear Plugs to the system. The microphone 1-4 and a speaker 1-5 are located in the eyeglass. Although not illustrated, the microphone 1-4 can be located in the Ear Plug, for example, in the tail 12-5.

In addition, another embodiment is indicated by the dotted rectangle 15-7 instead of placing the components inside an eyeglass, these components can be contained in a small hand held portable system, like an iPhone from Apple or an Android from Google. The left and right ear plugs are coupled to the portable device using the connector cord 12-7. Each end of the cord 12-7 is magnetically and electrically coupled to either the ear plug or the small hand held system. If the connector cord 12-7 gets caught in an obstruction, the magnetic forces holding the cord 12-7 to either the ear plug or the small hand held device becomes detached without harming the system. In other embodiments, one end of the connector cord 12-7 can have a magnetic coupling while the other end can use the conventional plug and jack connection or be hard wired to the hand held device.

The magnetic connection in FIG. 15*b* allows the portable system to come apart without damaging the components when an element of a component gets unexpectedly snagged after passing an obstacle. The components can be easily collected and reassembled to reconstruct the system. Further, the positioning of the magnets in the magnetic connections provide a lock and key combination in that the pattern and anti-pattern between mating surface connections can be designed to only allow one orientation when the connection is made. This prevents the power leads from shorting, to ground or other signal leads and damaging the system.

Figures 16A, 16B, 16C:
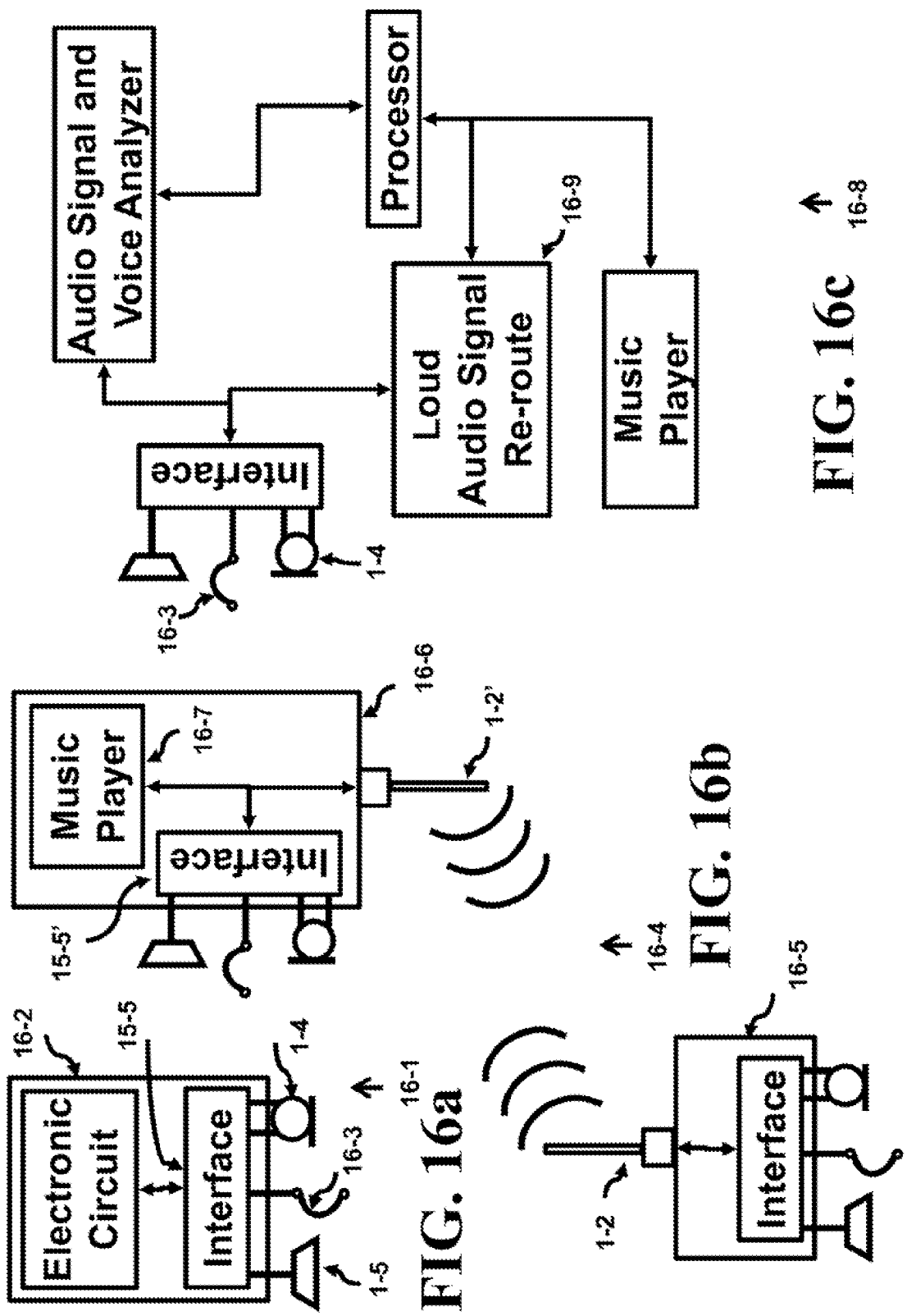
FIG. 16a shows an electronic circuit (for example, a music player) coupled to the Interface Block illustrating this inventive technique.
FIG. 16*b* illustrates a music player coupled to the Interface Block of one system that interfaces wirelessly to the user wearing eyeglass of a second system illustrating this inventive technique.
FIG. 16*c* shows a block diagram of the system that disables the music player when the external audio signals are loud illustrating this inventive technique.

FIG. 16*a* depicts yet another embodiment of the invention 16-1 where the portable system 16-2 comprises the Interface Block 15-5 and an Electronic Circuit Block, for example, a Music Player Block, stored audio recording web browser output, cell phones. Internet radio output, etc. Many of the other blocks introduced earlier can be incorporated into this system but have been removed to simplify the explanation of the invention. The user can listen to the music using the headphones 16-3 or the speaker 1-5. The entire portable system 16-2 can be embedded into the eyeglass with the exception of the ear plugs.

A different embodiment of the invention 16-4 is illustrated in FIG. 16*b*. The portable system 16-5 has an antenna 1-2 that communicates with a second system 16-6 having a second antenna 1-2'. The Music Player Block 16-7 sends the music to the enclosed Interface Block 15-5 of a first user and also sends the music wirelessly to the system 16-5 for a different user to listen. The second system, in some cases, can be a server on the network or a portable system.

Any of the systems, for example, 16-2, 16-5 and 16-6, can incorporate the block diagram 16-8 illustrated in FIG. 16*c*. This system allows the user to listen to music from the Music Player Block by using the headphones 16-3. Any recording from memory (not shown) can also be heard. However, as the system is providing music to a user, the Loud Audio Signal Re-route Block 16-9 listens to the outside environment by using the microphone 1-4. If the external audio signals are suddenly loud then this may warn of impending danger [car beeping, horn, ambulance, tire alarm, scuffle, personal attack, announcements in a PA (Public Address) system, etc.]. The Audio Signal and Analyzer Block, the Loud Audio Signal Re-route Block 16-9, and the processor Block can work together to pause the music and switch the user to the microphone 1-4. The microphone 1-4 sends its output through the Interface block and reroutes the output to the headphones 16-3 so the user can listen and determine the danger level.

This allows the user to interact with an electronic system, such as listening to music, and be notified when a dangerous situation may be occurring in the immediate vicinity of the user. The notification interrupts the user's interaction with the electronic system and presents to the user the newly determined potentially dangerous situation. The user can then decide on the urgency of this situation, and react according to their judgment.

FIG. 17*a* presents another block diagram 17-1 that has an Analyzer Block 17-10 coupled to the Selection Circuit Block 17-5. The Analyzer Block 17-10 measures the volume disturbance at microphone 1-4 and sends the result to the Selection Circuit Block. Meanwhile the user is listening to the Music Player Block by the path 17-3 going through the Multiplexer Block 17-2 to the path 17-6 going to the Interface Block and applies the music to the headphone that the user is wearing. Once the Selection Circuit Block decides that the external audio signals exceed the set limit then the user needs to evaluate the external audio signals (the Selection Circuit Block 17-5 switches the state of the Multiplexer Block by disabling the connectivity of path 17-3 to 17-6 and enabling the connectivity of path 17-4 to path 17-6), the loud external audio signals picked up by the microphone 1-4 are transferred from path 17-4 through the Multiplexer Block 17-2 to the path 17-6 going to the Interface Block and applies the loud audio signals to the headphone that the user is wearing letting the user evaluate the urgency of the loud, audio signals.

FIG. 17*b* presents several waveforms 17-7 to help better describe the invention. The top waveform 17-9 depicts the external loud audio signals while the middle and bottom waveform determines the times the user is listening to the music or external microphone. For instance, the user is listening to the external microphone between $t_1$ and $t_2$. The multiplexer can be in one of two possible states: passing the stimulus from the Interface Block due to the microphone or passing the music from the Music Player Block. From time equals 0 to $t_1$, the external volume 17-9 is less the threshold level 17-8, so the user listens to the music 17-13 and the multiplexer remains in a given state. Between times $t_1$ and $t_2$, the external volume 17-9 of exceeds a threshold level 17-8. The multiplexer changes state so that the user listens to the microphone 17-11. Assuming the loud audio signals poses no danger, then between time $t_2$ and $t_3$, the external volume 17-9 being below the reference level 17-8, allows the user to listen to music 17-12 again.

In case the user determines there is no threat, but the noise continues, the user can override the system to ignore the noise by issuing a Computer Command. The system has the capability to analyze the sound after the user determines there is no threat and remove or filter that noise out by treating it as background noise. The user can. In this case, continue listening to their music until another new loud noise is detected.

A block diagram 18-1 of an intelligent portable conversation system is depicted in FIG. 18*a*. The microphone 1-4 picks up the conversation, sends the signal to the Voice Recognition Block 9-2, and then converts the Speech into Text Block and stored into memory (not shown). The Determination Circuit Block 18-9 using the Voice Recognition Block 9-2 determines the last several topics of discussion. These topics form the search parameters. These parameters can be stored in memory and then sent as a wireless signal 18-2. When the Switch 18-5 is disabled, there are no silent periods and the system can save power since the Text to Speech. Block will not be used. The wireless signal 18-2 is captured by the network and routes the request to a search engine.

Once the search engine is finished, the response is routed through the network to the intelligent portable conversation system 18-6 as the wireless signal 18-7 in FIG. 18*b*. The wireless signal is captured by the antenna, processed by the RF Module Block and stored into the Memory Block. The Determination Circuit Block 18-9 determines when there is a period of silence in the conversation and then reads the result out of memory by enabling the Switch 18-5 allowing the text from the web to be converted into speech OR wire 18-8. The Determination Circuit Block also switched the Multiplexer Block 3-10 and allows the speech placed on 18-8 to transfer to the wire 18-4 that provides the speech to the Interface clock. The Interface Block informs the user wearing at least one ear plug 16-3 the result of the search analysis. The user in turn considers what they have heard from the search results and can fill the silent period in the conversation with information obtained from the web.

A flowchart 19-1 for the intelligent portable conversation system is illustrated, in FIG. 19*a*. After moving from Communicate 19-2, Recognition converts the group discussion into text, and then the text is stored into Memory after which Categorize Topics categorizes the text by topics. In Silence Decision if there is no silence, it means someone in the group is talking and the control moves back to Communicate 19-2. On the other hand, if there was a period of silence, the flow moves to Recall from Local Memory to recall the last several topics from memory while Text to Speech converts the text to speech and in State Information the result is sent to the user. The user in turn considers what they have heard from the search results and fills the silent period in the conversation with topic information that has just been discussed.

Another flowchart 19-3 for the intelligent portable conversation system is illustrated in FIG. 19*b*. Moving from Communicate 19-2, the flow moves to Recognition Memory and converts the group discussion into text, in Categorize Topics the text is categorized by topics, stores the text into memory (not shown) then the flow moves to Recall Topics which recalls the last few topics. These topics are sent wirelessly to the network by RF Link and the network routes the topic list to WWW which is the World Wide Web, also known as the Internet, to search engines that perform searches on the recalled topics. In Store Topic Results the search result from the Internet is collected and is wirelessly sent to the system and stored in local memory. In the Silence Decision if there is no silence, it means someone in the group is talking, and the control moves back to Communicate 19-2'. On the other hand, if there was a period of silence, the flow moves to Recall Last Topics to cause the system to go to the local memory, recalls the last several topics, convert the test into speech after which Stare Information sequences through the list of several topics and are presented to the user. The user in turn considers what they have heard from the search results and fills the silent period in the conversation with topic information that has just been discussed.

Figure 20:
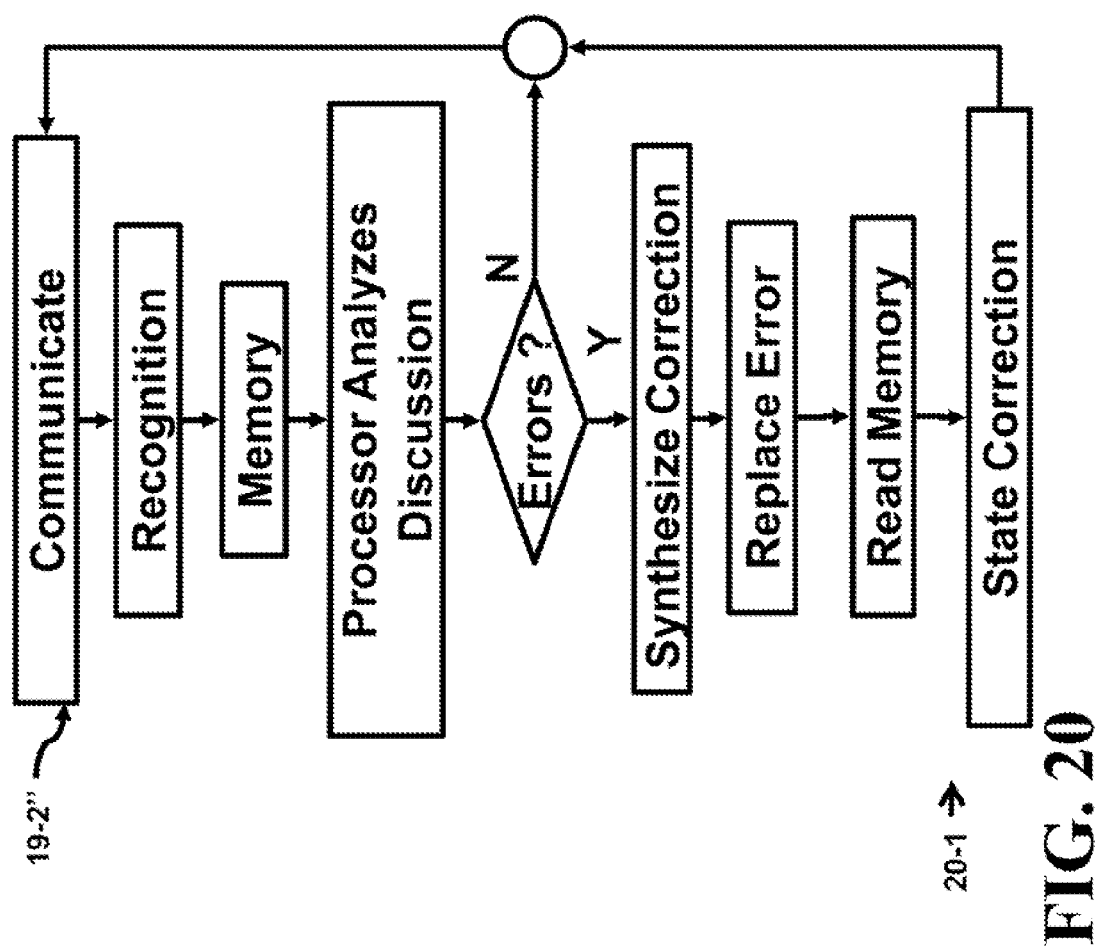
FIG. 20 shows an additional embodiment of a flow chart that identifies errors in the conversation and makes suggestions illustrating this inventive technique.

FIG. 20 illustrates the flowchart 20-1 of yet another embodiment of the invention. Moving from Communicate 19-2", the flow moves to Recognition converts the group discussion into text, then the text is stored in Memory after which Processor Analyzes Discussion uses the text to check for grammatical errors. If there are none, continue to Communicate 19-2". On the other hand, if there are errors, the flow moves to With Size Correction to correct the error and Replace Error replaces the error with the correction and stores the correction into memory (not shown), then the flow moves to Read Attention which reads the result from memory and converts the test into speech and then the State Correction sends the correction to the user. The user can use this information as necessary.

Various alterations, improvements, and modifications will occur and are intended to be suggested hereby, and are within the sprit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts.

Finally, it is understood that the above description is only illustrative of the principles of the current invention. It is understood that the various embodiments of the invention, although different, are not mutually exclusive. In accordance with these principles, those skilled in the art may devise numerous modifications without departing from the spirit and scope of the invention. Although, the system block diagrams show various blocks within (processor, DSP, Memory, Analyzer, etc.), a handheld system can be designed by using any combination of these blocks. One version of the processor comprises a CPU (Central Processing Unit), microprocessor, multi-core-processor, DSP, a front end processor, or a co-processor. All of the supporting elements to operate these processors (memory, disks, monitors, keyboards, power supplies, etc), although not necessarily shown, are known by those skilled in the art for the operation of the entire system. Many portable wireless systems as well as non-portable systems can benefit from the inventive techniques presented here.

In addition, the network and the portable system exchange information wirelessly by using communication techniques such as TDMA (Time Division Multiple Access), EDMA (Frequency Division Multiple Access), CDMA (Code Division Multiple Access), OFDM (Orthogonal Frequency Division Multiplexing), UWB (Ultra Wide Band), WiFi, Bluetooth, etc. The network can comprise the phone network, IP (Internet protocol) network, LAN (Local Area Network), ad hoc networks, local routers and even other portable systems.

What is claimed is:

1. An intelligent conversation system augmenting a conversation between two or more individuals comprising:
    a speech to text block configured to convert voices of the conversation into text;
    a determination circuit configured to determine topics from the text of the conversation, wherein search parameters determined by the determination circuit from the topics are sent to an Internet and search results corresponding to the search parameters are received from the Internet;
    a memory configured to store the search results; and
    a finite state machine configured to sequence through the search results to generate recall topics.

2. The apparatus of claim 1, wherein
    a search engine is configured to operate on the search parameters to generate the search results.

3. The apparatus of claim 1, wherein
    the speech to text block is configured to convert the recall topics to speech.

4. The apparatus of claim 3, further comprising:
    an interface block configured to apply the speech of the recall topics to one of the two or more individuals.

5. The apparatus of claim 3, further comprising:
    an earphone configured to transmit the speech of the recall topics to one of the two or more individuals.

6. The apparatus of claim 5, wherein
    the recall topics are used by one of the individuals to augment the conversation.

7. An intelligent conversation system augmenting, a conversation between two or more individuals comprising:
    a determination circuit configured to segregate the conversation into topics and to extract search parameters from the topics, wherein
    the search parameters are sent to a search engine and
    search results corresponding to the search parameters are received from the search engine;
    a memory configured to store the search results; and
    a finite state machine configured to sequence through the search results to generate recall topics.

8. The apparatus of claim 7, further comprising:
    a speech to text block configured to convert voices of the conversation into text.

9. The apparatus of claim 7, wherein
    a server is located on the world wide web configured to perform operations corresponding to the search engine.

10. The apparatus of claim 7, wherein
    the speech to text block is configured to convert the recall topics to speech.

11. The apparatus of claim 10, wherein
    the speech to text block conforms to an AAC (Advanced Audio Codec) standard.

12. The apparatus of claim 10, further comprising:
    an interface block configured to apply the speech of the recall topics to one of the two or more individuals.

13. The apparatus of claim 10, wherein
    an earphone is configured to transmit the speech to one of the individuals.

14. The apparatus of claim 13, wherein
    the recall topics are used by one of the individuals to augment the conversation.

15. A method of augmenting a conversation between two or more individuals comprising the steps of:
    segregating the conversation into topics using a determination circuit;
    extracting search parameters from the topics using the determination circuit;
    sending the search parameters to a search engine;
    receiving search results corresponding to the search parameters from the search engine;
    storing the search results into a memory; and
    sequencing through the search results stored in the memory with a finite state machine to generate recall topics.

16. The method of claim 15, further comprising the steps of:
    configuring a speech to text block, to convert voices of the conversation into text.

17. The method of claim 15, wherein
    a server located on the world wide web is configured to perform a search of the search results.

18. The method of claim 15, wherein
    the speech to text block is configured to convert the recall topics to speech.

19. The method of claim 18, further comprising, the step of:
    transferring the recall topics to one of the two or more individuals to augment the conversation.

* * * * *